(12) United States Patent
Leza Roa et al.

(10) Patent No.: US 9,994,383 B2
(45) Date of Patent: Jun. 12, 2018

(54) OPAQUE SINGLE-LAYER BOTTLE WITH LIGHT PROTECTION AND PRODUCTION METHOD THEREOF

(71) Applicant: SOCIEDAD ANÓNIMA MINERA CATALANO ARAGONESA, Saragossa (ES)

(72) Inventors: Fortún Leza Roa, Saragossa (ES); Miguel Ángel Caballero López, Saragossa (ES)

(73) Assignee: SOCIEDAD ANÓNIMA MINERA CATALANO ARAGONESA, Saragossa (ES)

( * ) Notice: Subject to any disclaimer, the term of this patent is extended or adjusted under 35 U.S.C. 154(b) by 1 day.

(21) Appl. No.: 14/905,233

(22) PCT Filed: Jul. 15, 2013

(86) PCT No.: PCT/ES2013/070505
§ 371 (c)(1),
(2) Date: Jan. 14, 2016

(87) PCT Pub. No.: WO2015/007921
PCT Pub. Date: Jan. 22, 2015

(65) Prior Publication Data
US 2017/0015485 A1    Jan. 19, 2017

(51) Int. Cl.
| | |
|---|---|
| *B65D 81/30* | (2006.01) |
| *C08L 67/02* | (2006.01) |
| *B65D 1/02* | (2006.01) |
| *C08J 3/20* | (2006.01) |
| *C08J 5/00* | (2006.01) |
| *C08K 3/08* | (2006.01) |
| *C08K 3/22* | (2006.01) |
| *C08L 25/06* | (2006.01) |
| *C08L 51/04* | (2006.01) |

(52) U.S. Cl.
CPC .......... *B65D 81/30* (2013.01); *B65D 1/0207* (2013.01); *C08J 3/203* (2013.01); *C08J 5/00* (2013.01); *C08K 3/08* (2013.01); *C08K 3/22* (2013.01); *C08L 25/06* (2013.01); *C08L 67/02* (2013.01); *C08J 2367/02* (2013.01); *C08J 2425/06* (2013.01); *C08L 51/04* (2013.01)

(58) Field of Classification Search
CPC ..................................................... B65D 81/30
See application file for complete search history.

(56) References Cited

U.S. PATENT DOCUMENTS

| | | | |
|---|---|---|---|
| 2005/0089658 A1* | 4/2005 | Scantlebury | B65D 1/0207 428/35.7 |
| 2010/0304168 A1* | 12/2010 | Dornbach | B29B 11/14 428/542.8 |

FOREIGN PATENT DOCUMENTS

| | | |
|---|---|---|
| EP | 1318174 A1 | 11/2003 |
| EP | 1541623 A1 | 6/2005 |
| EP | 1681239 A1 | 7/2006 |
| EP | 08013526.2 A1 | 2/2010 |
| EP | 2617654 A1 | 7/2013 |
| FR | 2836893 A1 | 9/2003 |
| FR | 2869019 A1 | 10/2005 |
| JP | 2004058565 A | 2/2004 |
| WO | 2002074846 A2 | 9/2002 |
| WO | 03064267 A2 | 8/2003 |
| WO | 2004069909 A2 | 8/2004 |
| WO | 2007128085 A2 | 11/2007 |
| WO | 2008027753 A1 | 3/2008 |
| WO | 2008077468 A1 | 7/2008 |

OTHER PUBLICATIONS

International Search Report for PCT/ES2013/070505 filed Jul. 15, 2013.

* cited by examiner

*Primary Examiner* — Michael Pepitone
(74) *Attorney, Agent, or Firm* — Notaro, Michalos & Zaccaria P.C.

(57) ABSTRACT

Single-layer plastic container with inorganic light-shielding fillers provides a strong light shield, including near-total shields blocking the whole light spectrum, in a light weight container. The plastic container contains at least two different thermoplastic polymers that functionally complement each other. Light-shielding inorganic fillers contain at least two different inorganic substances that complement each other in their light-shielding function. The plastic compositions achieve light shielding in very light single-layer containers without the cost and complexity of multi-layer structures. Only conventional equipment and production processes are required.

10 Claims, 10 Drawing Sheets

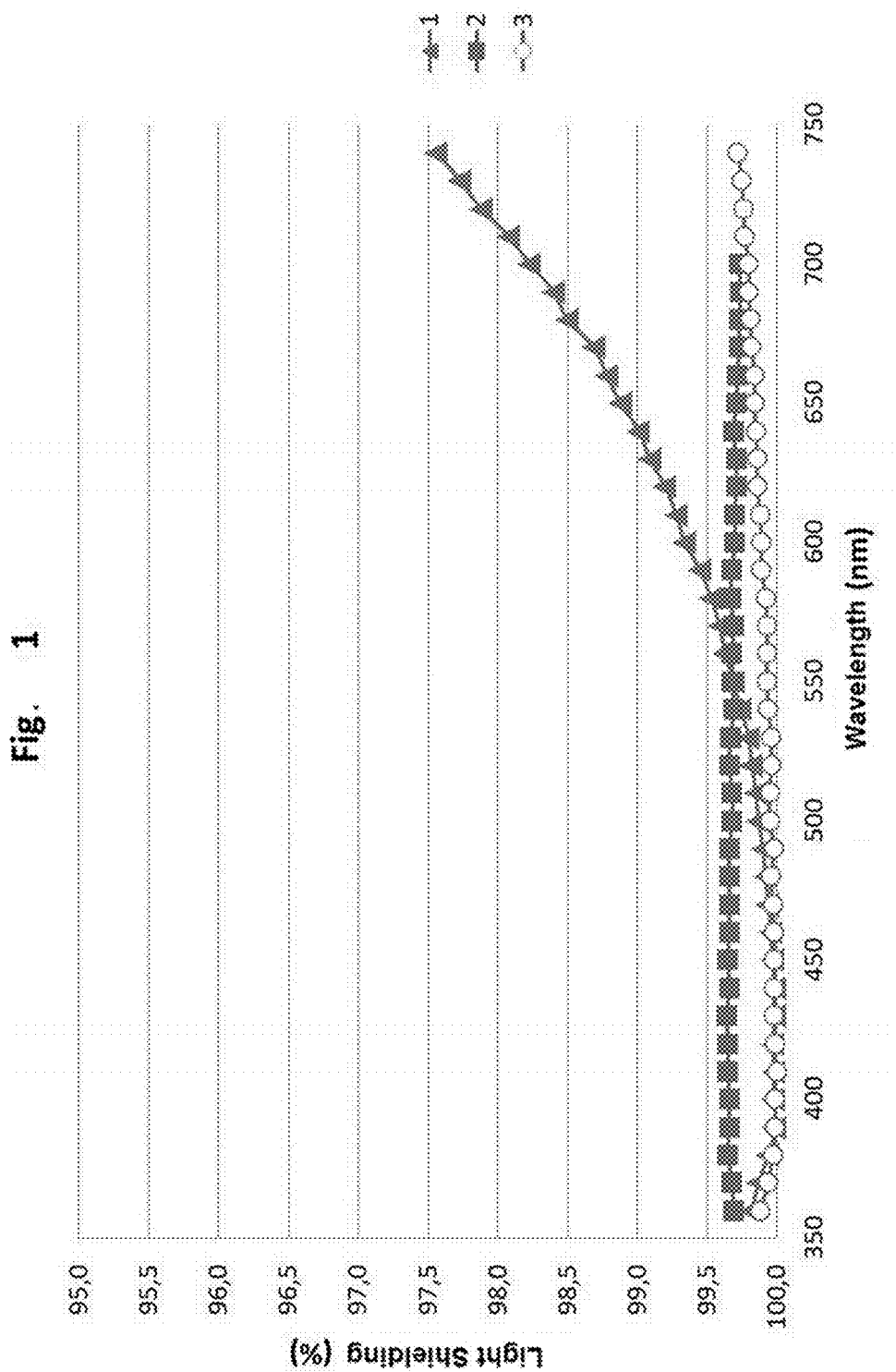

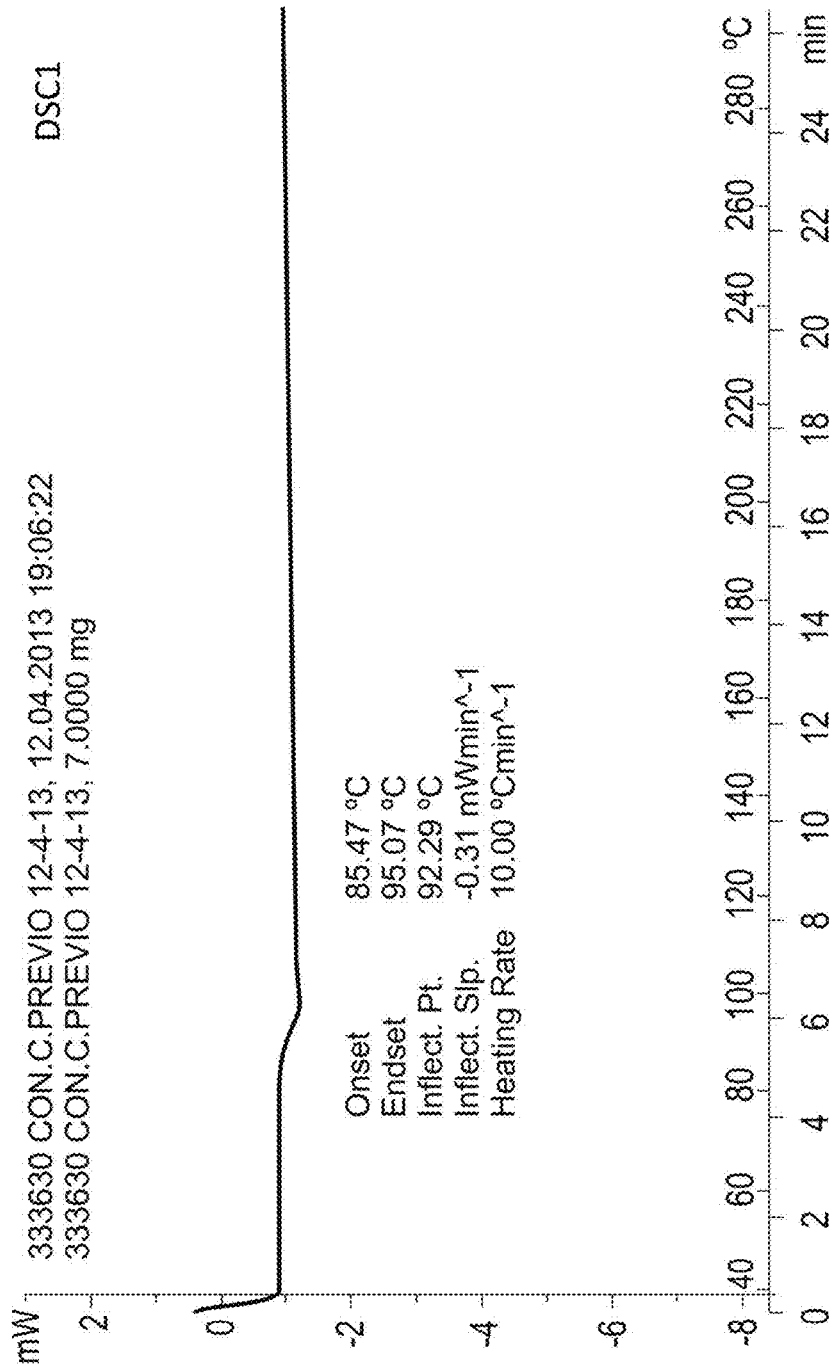
Fig. 2.1

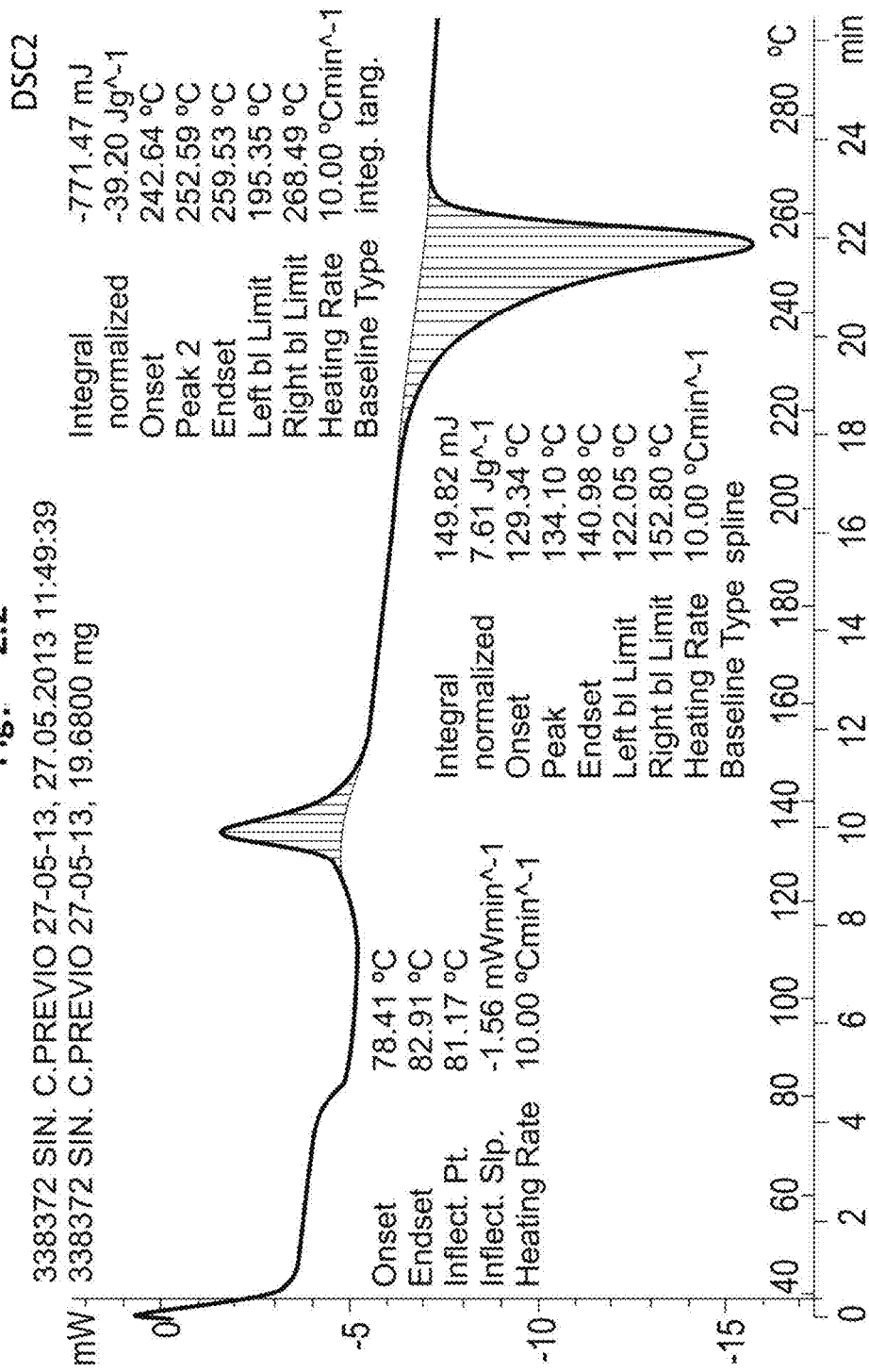

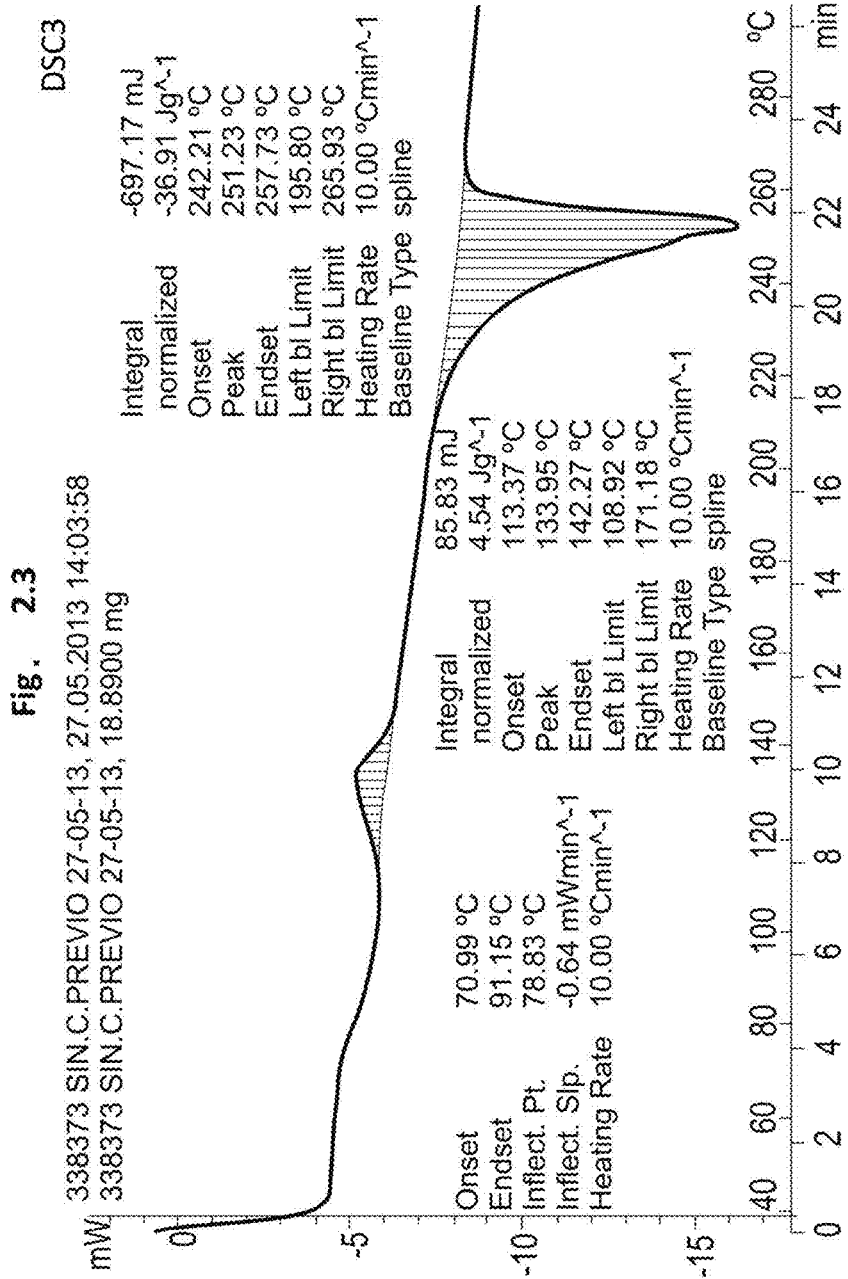
Fig. 2.3

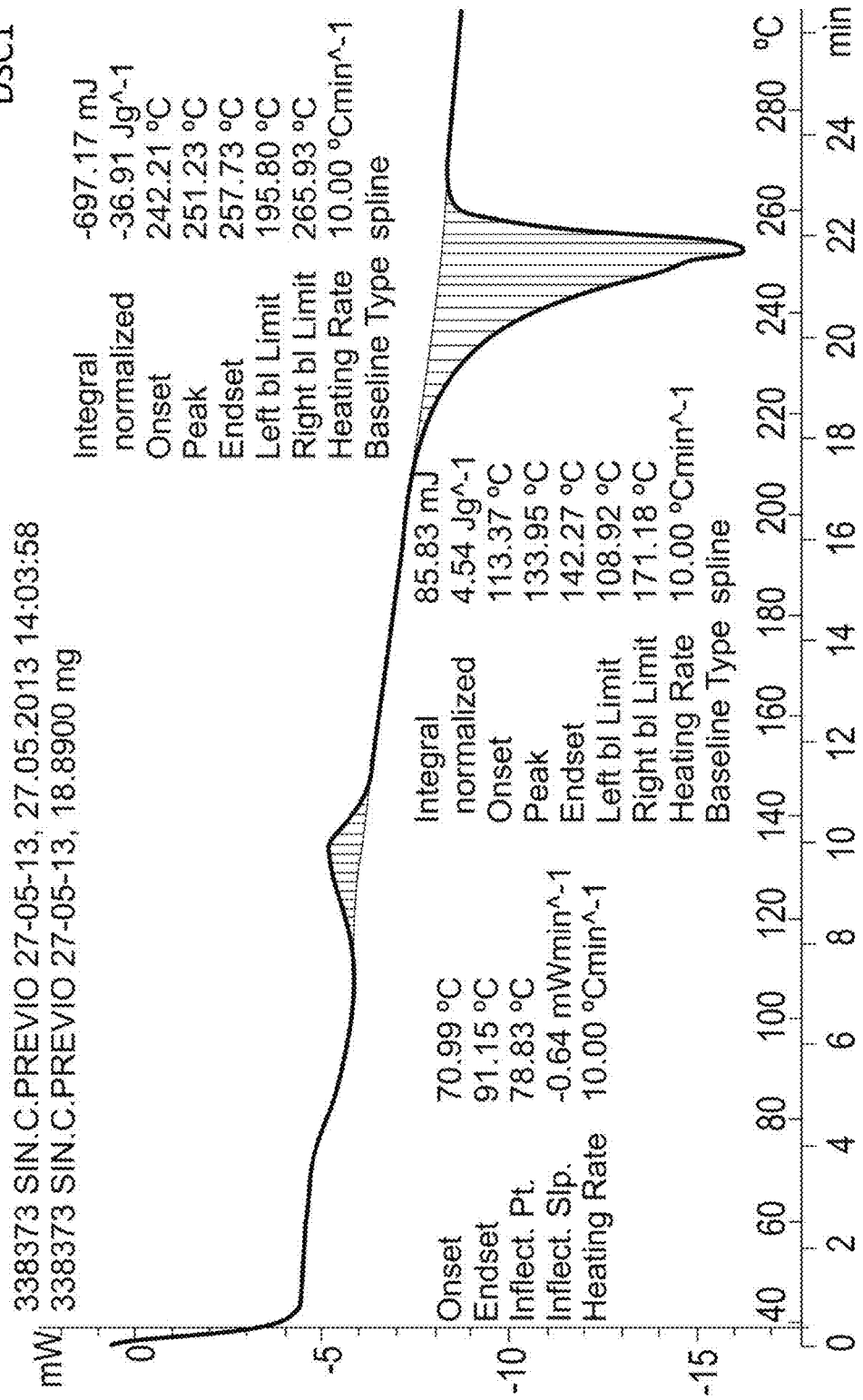
Fig. 4.1

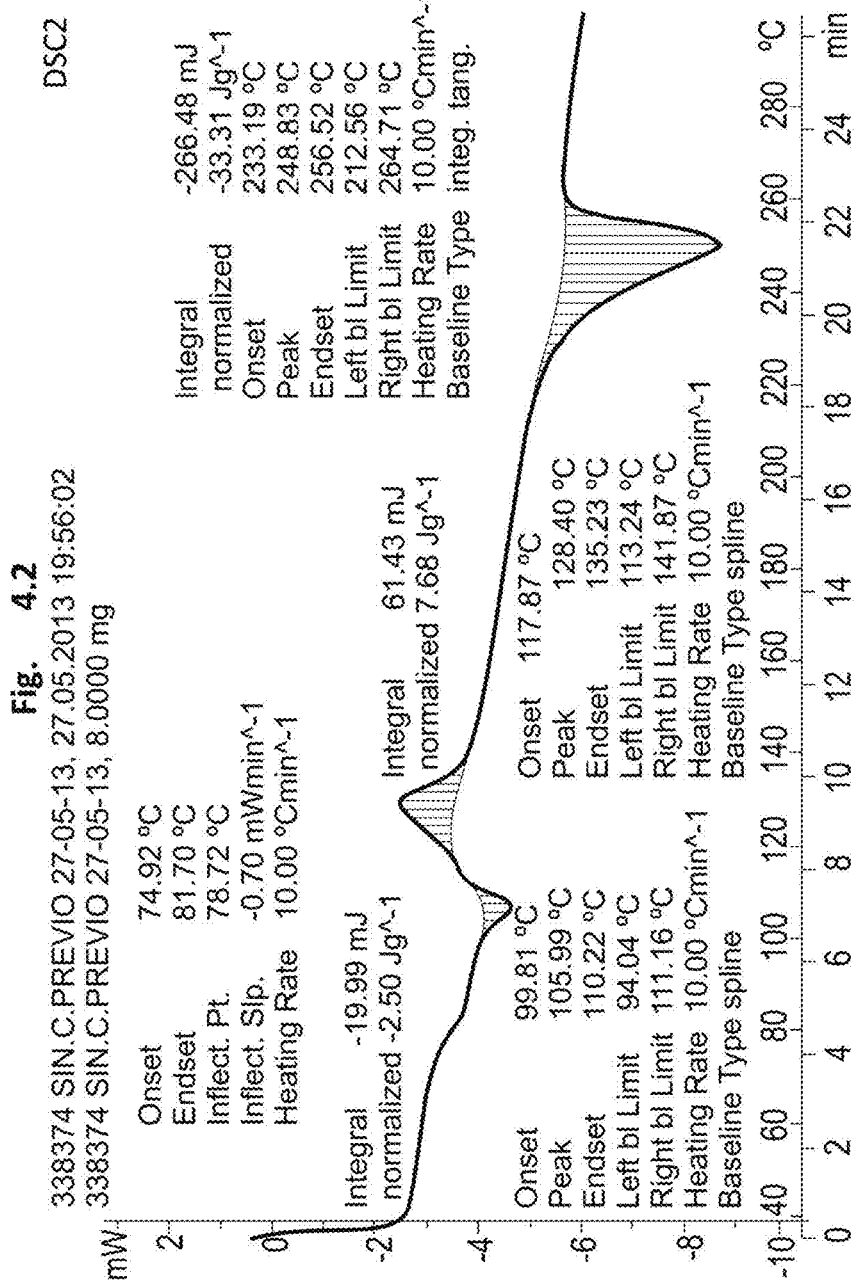
Fig. 4.2

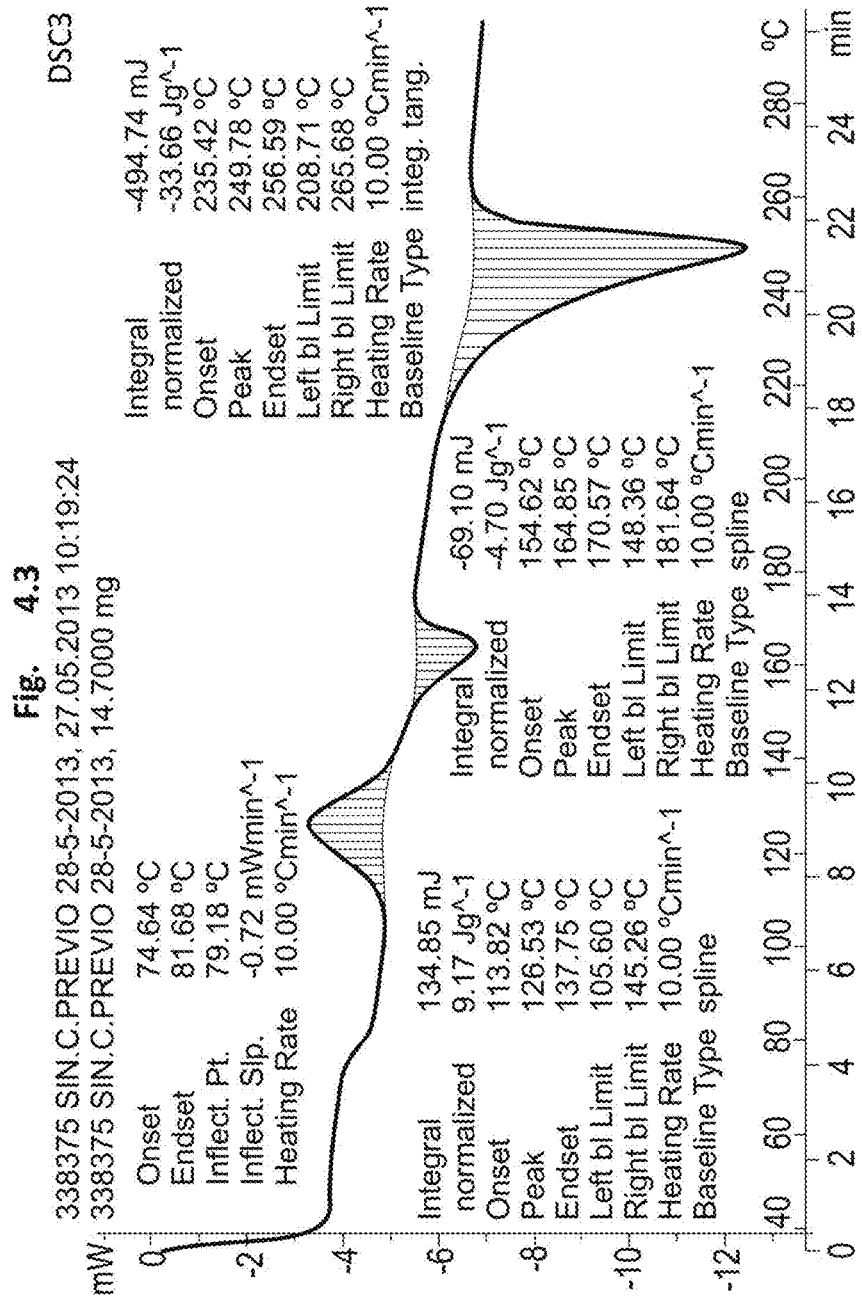
Fig. 4.3

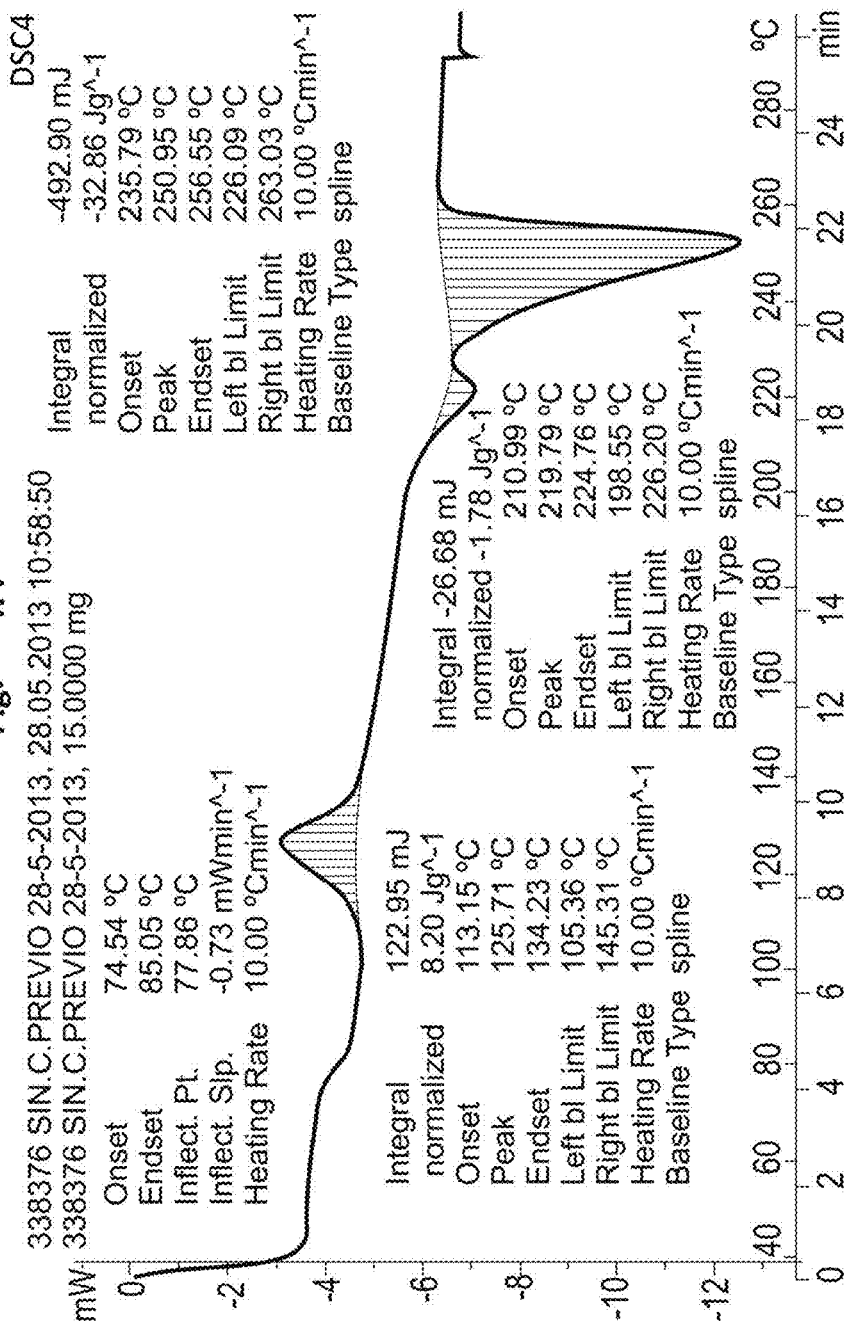

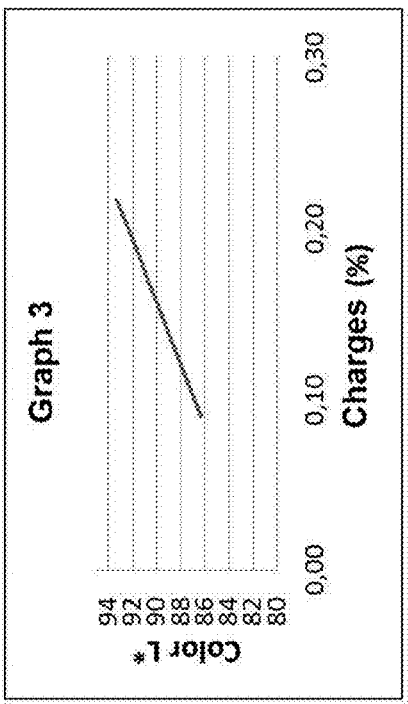
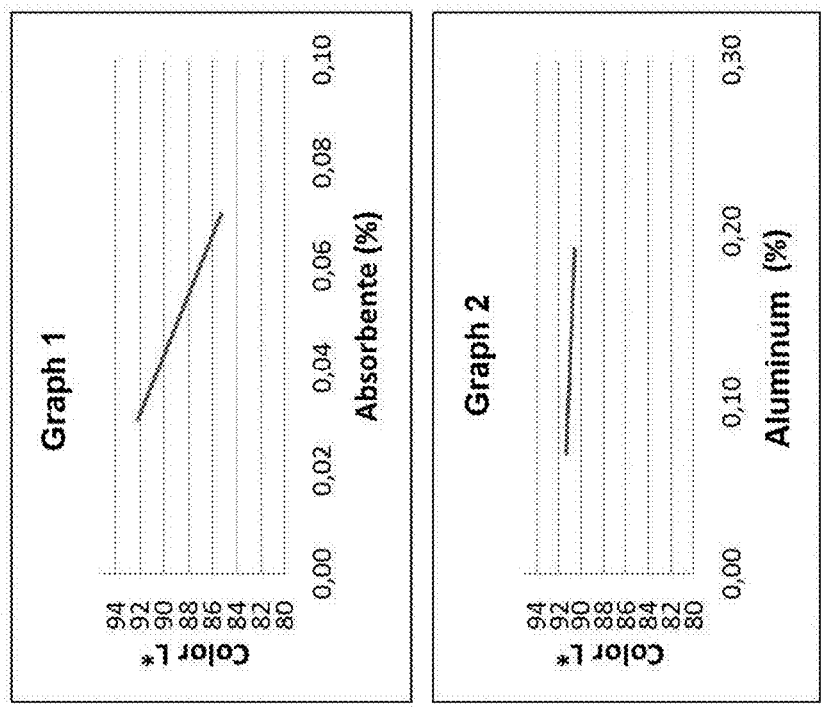
Fig. 5

OPAQUE SINGLE-LAYER BOTTLE WITH LIGHT PROTECTION AND PRODUCTION METHOD THEREOF

The present invention relates to a single-layer plastic container such as, for example, a single-layer plastic bottle, having inorganic light-shielding fillers that afford a very high light shield, even a virtually total shield in the whole light spectrum, with a very light weight container. The plastic structure of the container comprises at least two thermoplastic polymers of a different nature that complement each other in their function of structurally constituting the container, and the light-shielding inorganic fillers comprise at least two inorganic substances of a different nature that complement each other in their light-shielding function.

The differentiating quality of this container compared to others intended for similar purposes lies in the fact that, due to the particular constitution of the plastic structure and the efficient combination of inorganic shielding fillers (hereafter the fillers), it is possible to achieve modular light shields, even virtually total shields, in very light single-layer containers without having to resort to the complex and costly multi-layer structures that are usual when shielding levels close to absolute are sought, and all of this using conventional equipment and production processes. The constitution of the plastic structure and the combination of fillers included in the container are achieved by controlled addition, to a main semi-crystalline thermoplastic base, specifically, polyethylene terephthalate (hereafter PET), a concentrated additive (hereafter additive) which contains the fillers and an amorphous plastic other than PET in which the fillers are previously dispersed, such that the amorphous plastic contained in the additive has the following characteristics: its glass transition temperature (Tg) is higher than the Tg of the PET (Tg PET=80° C.) ((Tg of the amorphous base of the concentrate)<80° C.)); it is only slightly hygroscopic ((maximum water absorption)<0.1% by weight at saturation)), it does not have a specific melting point (no Tm) and it is a graft polymer, specifically, high impact polystyrene (hereafter HIPS).

FIELD OF THE INVENTION

In the field of containers with light protection obtained by incorporating inorganic shielding fillers to PET, the present invention relates to a single-layer plastic container with light shielding, wherein the procedure to incorporate the light-shielding fillers is performed by adding, to the main plastic base, in our case PET, a concentrated additive that contains a HIPS polymer base in which the inorganic shielding fillers, that contain TiO2 and Al, have previously been dispersed.

Other plastic containers related to that presented in this invention, designed to protect their contents from light radiation, such as those intended to contain UHT long-life milk (more than four months), are available in different plastic media and with different types of structures, for example: three-layer polyethylene, three-layer PET, two-layer PET or single-layer PET. However, in practice there are no known viable references of single-layer containers that achieve total shields and normally structures of more than one layer are used to achieve such levels of protection.

Conventionally, plastic containers that incorporate light protection have a white-coloured surface due to the fact that one of the most widespread uses for such containers is the bottling of long-life milk (e.g. UHT milk) and/or UHT milk products. There are known solutions in which TiO2, a white pigment with a high concealing power, is combined with light absorbers that effectively reinforce the shield provided by the TiO2, however these light absorbers necessarily darken the surface of the containers rendering an unattractive and undesirable greyish colour and this means that the concentrations that can be used in the containers and hence the threshold of their efficacy are limited. In our case, in which practically total protection is sought in single-layer containers, the high quantities of absorber required may affect commercial viability due to the effect of an unacceptable grey end colour. To avoid this circumstance and in order to increase the concentrations of the TiO2 adjuvant in the shielding function, Al has been used since its shielding efficacy is based on the reflecting effect and not on light absorption; this means that the container surface does not "swallow" the light but rather that it reflects it, resulting in a surface with a greater luminosity and consequently the proportion of Al that can be used is greater than that of conventional absorbers, affording very high shielding options without detrimental alterations to the colour of containers. There are no known commercial containers similar to that described in the present invention, whose surfaces have a colour L* (measurement of white on a scale of 0 to 100, where 0 is black and 100 absolute white) lower than 86; we naturally are referring to the colour without labels, specific additional colouring agents or any other coatings that may be added to the containers in the form of commercial or corporate identifications. Consequently, the objective chosen was to achieve, on the container surface, a colour L* higher than 86 (L*>86, in the "Cie-Lab" scale), regardless of the shielding level.

In the following table (Table 1), with the same TiO2 base, the effects of a conventional light absorber on shielding and colour in containers are compared with those of Al. For this purpose the TiO2 concentration has been maintained fairly constant at around 10% and it has been combined with different concentrations of both the light absorber (in this case an iron oxide which darkens the container to a lesser degree than carbon black or conventional carbon), and Al.

The shielding % has been calculated using an Iso-Tech luxometer to measure the light intensity inside the container (LUX), exposed to an external light of 2300 LUX (highly representative of the exposure that containers are subjected to at the usual points of sale), so that: (shielding %)= ((external LUX−internal LUX)/(external LUX))×100.

The aim of the experiment is to evaluate the possibility of obtaining a total shield in the container (99.9%), while maintaining an L* colour>86 on its surface.

TABLE 1

| Container | TiO2 % | Abs. % | Al % | TiO2/Al ratio | L* Colour | Shielding % |
|---|---|---|---|---|---|---|
| 1 | 10.2 | 0.030 | — | — | 91.9 | 93.0% |
| 2 | 9.9 | 0.040 | — | — | 90.7 | 97.0% |
| 3 | 10.3 | 0.050 | — | — | 89.0 | 99.0% |
| 4 | 10.2 | 0.070 | — | — | 85.1 (Does not comply) | 99.7% (Does not comply) |
| 5 | 10.3 | — | 0.070 | 147 | 91.9 | 96.30% |
| 6 | 9.9 | — | 0.100 | 99 | 91.6 | 98.17% |
| 7 | 9.8 | — | 0.120 | 82 | 89.8 | 99.81% |
| 8 | 10.1 | — | 0.150 | 67 | 90.2 | 99.87 (Complies) |
| 9 | 10.3 | — | 0.190 | 54 | 91.4 | 99.91% (Complies) |

The following deductions can be made from the data in the above table:

That the conventional solutions for white single-layer containers with light shielding, in which TiO2 is combined with light absorbers, afford darker colours when the shield is increased because of the effect of a greater proportion of absorber present in the fillers. Due to this, it is in practice unviable to obtain white single-layer containers with filler contents and/or reasonable weights, using the aforementioned conventional solutions.

And that the combination of TiO2 and Al contained in the shielding fillers, according to the invention, are advantageous and allow virtually total light shields to be achieved in white single-layer containers.

In the following table (Table 2) the L* colours are compared with the levels of shielding in several containers (1 to 7), all of which are single-layer bottles made according to the present invention.

TABLE 2

| Container | TiO2 % | PET % that container contains | L* colour | Shielding % | PET/ HIPS ratio | TiO2/Al ratio |
|---|---|---|---|---|---|---|
| 1 | 5.4 | 91 | 87.0 | 97% | 28 | 60 |
| 2 | 7.8 | 88 | 87.5 | 98% | 20 | 60 |
| 3 | 9.6 | 84 | 89.5 | 99% | 14 | 60 |
| 4 | 10.2 | 83 | 91.0 | 99.5% | 13 | 60 |
| 5 | 10.8 | 82 | 92.0 | 99.8% | 12 | 60 |
| 6 | 12.3 | 81 | 92.7 | 99.9% | 13 | 60 |
| 7 | 13.0 | 80 | 93.3 | >99.9% | 13 | 60 |

From the results shown in table 2 it can be deduced, as a surprising effect, that unlike conventional shielding filler solutions based on light absorbers, the application of the present invention, based on the shielding capacity, by reflection, of Al combined with TiO2, allows simultaneously to improve the L* colour and level of shielding in white single-layer containers.

CURRENT STATE OF THE ART

There are many precedents of bottles made of plastic material, in particular PET, intended to protect their contents from light radiation, that include shielding fillers, in particular TiO2, to obtain the desired objective. These bottles can be found both with one single layer and with several layers of materials, with one or several shielding fillers dispersed in one single layer or in different combinations for each layer of the material if the bottle is multilayer. The known containers of this type, whether single-layer or multilayer, normally consist of one type of plastic material in which the shielding fillers are dispersed by means of different procedures that are now be described in more detail, or by mixes of materials, in which case, their chemical compatibility is sought. Common examples that can be found in the market are polyolefin, usually polyethylene (PE), three-layer containers; three-layer PET containers; two-layer PET containers and single-layer PET containers. Although there are known examples of commercial single-layer PET containers with high levels of protection (up to 98%), prior to the present invention, achieving virtually total shields (99.9% protection) has been systematically reserved to multilayer PET or PE containers.

It is increasingly frequent for photosensitive substances such as milk, milk products, fruit pulp products and other functional drinks with natural active ingredients, to be packed in plastic containers, PET being one of the polymers that is gaining a growing market share. In order to protect active ingredients that are sensitive to deterioration due to the effect of light, from damaging radiation, it is necessary to incorporate protective agents that are normally opaque or strongly coloured to protect in the visible spectrum (VIS), or agents that are relatively transparent, with specific absorption in the ultraviolet (UV) spectrum.

There are many substances that are sensitive to deterioration due to the action of light with the resulting alteration to organoleptic and nutritional properties. Amongst these substances vitamins, amino acids, peroxides or fats can be mentioned, each one of them being particularly sensitive to one or several wavelengths, specific to each substance and different one from another, so that there are photosensitive substances at practically any wavelength, both in the ultraviolet spectra (UVA) (up to 400 nm), and the visible spectra (VIS) (400 to 700 nm), in which there are specific sensitivities. For example:

Vitamin B2 (riboflavin): specific sensitivity reaches wavelengths of up to 550 nm. This region of the visible spectrum (VIS) is particularly critical because of the extreme sensitivity of vitamin B2 at around 550 nm, its degradation, in the case of milk, causes severe alterations to nutritional capacity, smell and taste (the organoleptic alteration caused in milk by the effect of the degradation of riboflavin is known as "lightstruck flavour").

Vitamin A (retinol): 410-460 nm.

Vitamin C (ascorbic acid): the most aggressive wavelengths are below 300 nm.

Amino acids:

Chromophore compounds of different types, sensitivities can be found in both the UVA region and the VIS region and there deterioration can cause changes in the appearance of products that contain them.

The incorporation of light shields in containers intended for containing substances that are sensitive to deterioration induced by the action of UVA or VIS light is common practice in the industries of packaging and distribution of dairy products, fruit juices, pharmacy, drugs and, in general, food or preparations that contain substances that are susceptible to photolytic degradation.

Two spectral regions of radiations that are potentially aggressive for photosensitive substances must be differentiated:

The UVA non-visible region of the spectrum which covers from 200 nm to above 300 nm (but below 400 nm). This is a very energetic region but one that is relatively easy to protect since there are many commercial solutions that enable effective, practically total shielding; so much so that shielding solutions based on TiO2, or which contain large amounts of TiO2, afford total protection in the UV region if they achieve good levels of protection (over 95%) in the VIS. It is for this reason that, normally, no controls of protection in the UV region are carried out, as it would be a superfluous task.

The visible spectrum (VIS): ranges from approximately 400 nm to 700 nm wavelength. As previously explained, in this region there are specific sensitivities, amongst which it is important to highlight that of riboflavin at 550 nm. It is in the VIS where the currently available single-layer solutions, conventionally white and based on greater or lesser contents of TiO2 combined or not with other types of fillers, present shielding difficulties that are all the more marked the higher the wavelength is. As can be seen in FIG. 1, it is in the VIS region where protection for shielding materials based on TiO2 (normally opaque, white containers) becomes more difficult the greater the wavelength is, and for this reason, conventionally, measurements of % TR (% of incident light passing through bottle wall) refer to 550 nm (intermediate region of the VIS, of specific sensitivity for some compounds, such as vitamin B) as indicators of the shielding level (the lower the % TR is the greater the shielding level).

From amongst the multiple options that exist for preparing containers, both in terms of use of materials and the technologies for making and adding shields, from now on we will refer to containers formed by thermoplastic matrixes and, in particular, to some thermoplastic matrixes that afford the following benefits compared to other options such as glass, metal or complex combinations of different materials:

Processability: the current state of the art offers various alternatives of preparation based on commonly-used, easy to handle, perfectly-known thermoplastics.

Possibility of personalization: there are practically no technical and economic barriers to the choice of the geometry, shape and size of the container.

Lightness: the weight of plastic containers, in relation to other alternatives such as glass or metal, is usually and feasibly much less.

Cost-savings: the commoditization that many plastic materials have undergone due to their widespread use means that they are highly competitive compared to most alternative materials. Indeed, plastic is replacing an increasing number of materials for the production of containers Sustainability: the possibility of recovering and recycling most thermoplastics is widely known, there are well-established collection channels and affordable, regular technologies for sorting and reinserting them in the consumption circuit with total guarantees.

There are different ways of adding light shields to plastic containers, each with its own particular characteristics, benefits and drawbacks; the following are the most widespread:

Containers with an incorporated shield: in these containers the plastic matrix is loaded with materials that inhibit the passage of light, amongst which are titanium dioxide ($TiO_2$), silicon dioxide ($SiO_2$) or zinc sulfide (ZnS), amongst others, with or without other secondary fillers that help to complete the shield.

The filler content in this type of opaque containers with light protection is usually between 3% and 8% by weight of shielding fillers in relation to the total container weight, so that the difficulties in incorporating fillers and producing containers increases as the percentage of fillers increases. For high levels of protection, multilayer containers systematically contain less fillers than single-layer containers; however the manufacturing processes are much simpler and the required investment is considerably less in the case of single-layer containers.

Technologies and processes related to the production of this type of containers with light shields, available in the current state of the art, are cited below.

Multilayer allows the total mineral filler content to be reduced thanks to the combination of different additives in each layer, so that, usually, the inner layer is black and provides the greatest shielding capacity and the outer layer (in the case of two layers) or the outer layers (in the case of three layers), are filled with other materials that conceal the black colour that has a non-conventional appearance and is impossible to personalize by overlaying it with colours or labels.

Filler contents in this type of containers are usually between 3% and 5% by weight.

This technology affords shields which can be considered to be total shields at any wavelength but which present drawbacks due to the complexity of the equipment and processes involved: specific equipment is required, the investment is considerable, maintenance is costly and levels of rejection due to non-quality are much greater than in single-layer technologies.

Single-layer: feasible using equipment and processes that are much cheaper, more accessible and more flexible than the previous ones; however sufficient shielding levels to protect sensitive products can only be achieved at the expense of a significant increase in the amounts of fillers incorporated, said amounts normally being between 5% and not much more than 8 or 9% by weight, viable contents being limited by the difficulty of reasonably incorporating and processing higher percentages of fillers.

Another feature of the conventionally-obtained shields in this type of container is that they provide poorer shielding levels as the wavelength increases. However, there are perfectly viable solutions for sensitive products such as UHT milk and UHT milk products. Therefore it is difficult to obtain total shields for very long lifetimes or to protect substances that are extremely sensitive to photolytic deterioration.

The processing procedures, both those relating to the production of containers and those involved in adding shielding fillers to the polymeric matrix, are diverse and depend both on the typology of the actual container and the plastic materials that form the main matrix. The most frequent processes are indicated below.

Incorporation of Shielding Fillers to the Polymer Matrix.

It is very important for fillers to be totally dispersed and evenly distributed in the polymer matrix. To achieve this, one of the following procedures can be carried out:

Polymerization phase: this involves dispersing the fillers in one of the monomers or in the polymer precursor raw materials, before they enter the polymerization reactors. This is the most reliable way to ensure an excellent dispersion and homogeneous distribution of fillers, but it is not always possible to perform due to the complex nature of polymerization facilities and the fact that some fillers may interfere with the reaction processes. On the other hand it is an excellent way of ensuring the homogeneity of the shielding solution; there are known commercial solutions based on PET with TiO2 and light shields incorporated, both for single-layer and for multilayer containers, which provide excellent performance and ease of use in the processes for producing containers. However, they are very rigid solutions that are not particularly modular and are not always suitable for use in equipment that has to share the type of containers that it has to deal with.

Mixing in auxiliary extruders: this involves diverting a flow of melt-phase polymers at the exit from the reactors, before the usual pelletizing process, so that, by means of appropriate metering, fillers can be incorporated in the melted polymer flow in order to be homogenised and dispersed by specific screw systems that are normally multi-screw systems. Once the fillers and melt-phase polymer have been homogenised, the resulting compound is extruded for cooling and final pelletizing. These systems are expensive and complicated to install and to operate, but afford pellets ready for final use without any further operations being necessary.

Use of concentrates or master batches: they can be either in liquid or solid form, so that the filler is highly concentrated in a carrier that is compatible with the polymer matrix that will form the base of the desired container. After preparing the master batch, it is metered, in the appropriate proportion, to the concentration of final fillers required for the container, in the plasticizing screws of the injection, injection-blowing, extrusion-blowing or compression machines that form the precursor structures of the final containers (preforms, piece finished by injection, or extruded parison prior to blowing).

There exist metering systems that allow high precision of doses and normally the plasticizing systems are able to adequately homogenize the mix of polymer and master batch.

They are extremely versatile since they allow shielding levels to be regulated by simply adjusting the additive dose or concentrated master batch that is added to the main polymer flow; but they present difficulties in high addition proportions due to the changes that incorporating the concentrate can cause in the main polymer structure, as well as the possible need for additional auxiliary equipment to dry the additives if their structure is hygroscopic.

Production of Containers.

There are different procedures for the production of containers which have in common the fact that a hollow body is obtained, open at one of its ends, said opening constituting the mouth of the container and that, prior to the formation of the required piece by moulding, there is a process normally called plasticizing, which consists of the melting of the plastic material and its homogenization with the melted mass, or of this with additives or fillers, if relevant. The procedures to obtain containers, as already mentioned, are diverse and depend on the geometry, shape and size of the containers and on the nature of the plastic matrixes used. The most widespread procedures are:

Direct Injection.

The plastic material, once the corresponding fillers have been added, is plasticized and homogenized in a plasticizing chamber equipped with one or more rotating screws, at a temperature slightly higher than the melt temperature of the plastic material.

Once the plasticizing process has been completed, the melted material is inserted in a mould with one or more cavities, by means of the pressure transmitted by an injection plunger.

The mould cavities are at a temperature that is considerably lower than the melt temperature of the plastic and they are designed so that once the pieces have cooled and solidified inside the cavities they can be removed so that the cycle can be repeated again.

This type of process can be applied to thermoplastics such as PET, PA or PP, amongst others.

Normally, this process can be used for pieces in which the mouth has a greater diameter than any other area of the body so that it is not easily applicable in the case of a conventional bottle and, for this reason, it is not a preferred procedure in the case in question; however, it is described as a method that in theory is feasible to produce hollow pieces that serve as containers.

Infection-Blowing in One Single Stage.

The process begins in a very similar way to the previous one, with the particular feature that once the container precursor pieces or preforms have been injected they are removed from the mould partially solidified so that they have sufficient consistency to maintain a stable shape, but their temperature is higher than glass transition temperature (Tg), which is the temperature above which plastic material is malleable in solid state by mechanical action.

This preform, which is still hot upon its extraction from the injection mould, is inserted into a second blow-moulding unit. A second mould, this time a blowing mould, encloses the preform and air is inserted through its mouth at high pressure. This pressure causes the preform to swell up as the material is stretched, until it reaches the size and shape of the blowing mould. The material cools on the walls of the blowing mould, finally forming the container. Once the container is cold and stabilized by this effect, it is removed from the mould and the cycle can be repeated.

Blowing of Preforms.

The process begins with a cold, dimensionally stable piece, which is formed by injection as previously described, and is known as the preform.

In this case the preform must be heated until it reaches its moulding temperature (Tg), which is achieved by placing the preform in an IR radiation furnace.

Once the preform has been heated to above the Tg of the material, it is blown in the blowing mould in the same way as in the previous case.

This process is characteristic of PET and it is also applicable to other thermoplastics such as PLA or PP.

As will be explained further on, preforms can be formed with one single layer, or two or more layers. The blowing processes do not differ depending on the number of layers of the preforms, and the bottle, once blown, will have the same number of layers as the preform had.

Injection-Moulding of Preforms.

In a similar way to that described for the formation of containers by direct injection, hollow pieces are obtained, which in this case have to undergo a subsequent process of bioriented blowing to form bottles.

It is a process that is very typical of PET, in which firstly the material is dried since PET is hygroscopic and in a melted state (above 250° C.) it undergoes hydrolytic degradation in the presence of water. In the case of PET, which is typically presented in the form of granules (chips), drying occurs in a hopper through which hot, dry air passes at a temperature of between approximately 150° C. and 170° C., over a period of between 4 and 6 hours; this is sufficient to remove practically all of the moisture that the polymer contains.

The polymer then passes to the plasticizing chamber where it is melted and plasticized by the effect of the temperature and the friction of a rotating spindle.

The melted material is transferred to an injection plunger which forces the material at high pressure into a multi-cavity mould in which the preforms are cooled to stabilise their shape and dimensions before extraction.

In this type of process it is possible to obtain single-layer or multilayer performs. Multilayer preforms, normally of two or three layers, are effectively used to shield light, since the inner layers (the intermediate layer in the case of three layers or the inner layer in the case of two layers) can be filled with a strongly shielding material (normally black) that is concealed by the outer layer to present the desired final look of the container without any loss of the required protection.

The special feature for this type of preform is that they require specially adapted moulds and plasticizing systems with two spindles. In the case of the two-layer preform, the process normally functions by overmoulding, so that the outer layer is injected over the previously formed inner layer. In the case of the three-layer preform, the inner layers and outer layer are jointly injected and the intermediate layer is placed between them by means of a specific valve system located in the injection mould.

Compression-Moulding of Preforms.

The process starts with the plasticizing of the material, as in all of the previously described cases.

After plasticizing, the melted material is extruded and portions, with a uniform weight, are cut from the extruded material and placed in hollow moulds of the shape required for the preform. While the material is still hot and inside the mould, a ram presses the material, which adopts the shape of the mould due to the pressure exerted by the ram. Once it is cold, the preform is removed from the mould and the cycle can be repeated again.

The preforms obtained in this way can be blown in the same way and using the same equipment as that described for the blowing of preforms.

It is not a very usual process but there are systems of this type that are used to produce PET preforms.

Extrusion—Blowing.

Once again the process begins at the material plasticization stage.

By extrusion, the plasticized material flows through an opening or nozzle located at the end of the plasticizing chamber. This nozzle is designed in such a way that it forms a hollow tube, normally called a "parison", which flows continuously, hanging down from the nozzle on a vertical axis by the action of gravity.

At regular intervals a blowing mould, equipped with appropriate travelling systems, closes over the tube of extruded material, cutting off a portion that is equivalent to the axial length of the blowing mould. The mould, with the portion of extruded material still hot inside it, travels to a blowing unit in which high-pressure is inserted through the mouth of the mould. This pressure inflates the extruded tube in a direction that is perpendicular to its longitudinal axis, pushing the material against the walls of the mould where it cools and attains its final size and shape.

While one mould is completing the blowing process, the other starts to capture the portion of extruded tube, so that there is a continuous process of container forming by extrusion—blowing.

This process is characteristic of polyolefins (PP, PE), of polyvinyl chloride (PVC) and of PC, amongst other polymers, and for shielding effects three-layer containers are normally used, which have an intermediate layer that is black and that provides the shield, and outer and inner layers that conventionally tend to be white, although other alternatives are possible.

There currently exist PET grades that are suitable for producing containers using this technology.

There are already known patents that disclose containers with light shielding, as well as others that mention compositions involving mixtures of polymers, including PET and other polymers, with approaches that differ to that that disclosed in the present invention. Some of these are indicated below.

Patent EP 1541623 "Photoprotective composition for food containers".

It describes a white pigment that comprises TiO2, Al powder, a black pigment and a pearling agent to make the plastic opaque but it does not mention the intentional mixture of polymers nor HIPS as the plastic base of the additive that contains the shielding fillers.

WO2004069909 "Article comprising light absorbent composition to mask visual haze and related methods"

It cites the use of pigments specifically aimed at masking the "haze" (reduction in transparency due to cloudiness) produced by the mixture of incompatible polymers with plastic bases that can be PET. But it does not intend for there to be a high light shield in the container nor does it describe the use of high concentrations of mineral fillers added for this purpose to the HIPS plastic bases.

WO 03064267 "Opaque polyester containers"

It mentions the use of Al, once again to mask the "haze" caused by mixing immiscible ("incompatible") polymers together, in this case to achieve an increase in the gas barrier. It is not specifically oriented towards endowing the composition with light shielding nor is HIPS mentioned, which would not provide a gas barrier mixed with PET nor a light shield that would provide sufficient light protection for products sensitive to radiation, such as long-life milk.

EP 1681239 "Preform for container, has from comprising PET layer unit and barrier unit impermeable to visible light".

It describes the importance of protecting certain products that are sensitive to deterioration due to the effect of light radiation, but it is a multilayer container rather than a single-layer container such as the case before us, and it does not mention HIPS in the final composition or in the advantages of its contribution as a vehicle that facilitates the incorporation of the shielding fillers.

EP 08013526.2 "Resin composition for food containers".

It refers to a single-layer PET container and describes, as a possible form of obtaining it, adding a concentrate of mineral fillers that include TiO2 in a plastic base, to the main matrix of PET. However, PET is expressly mentioned in the final composition as the only polymer material present, without referring to HIPS, nor does it mention the combination of TiO2 and Al contained among the shielding fillers, and the maximum light shields described are not total light shields, so that it diverges from the subject matter of the present invention.

This patent also cites polymerization as one of the processes preferably chosen for incorporating the shielding fillers to the PET matrix.

FR2869019. A1 "Packaging articles, such as opaque bottles, and production method thereof"

It also refers to a container intended to protect the contents from light radiation by incorporating inorganic shielding fillers and it mentions milk as one of the products subject to packaging and protection, one of the possible procedures of incorporation being the use of a concentrate in a polymer base, also understood to be PET or polyester, but it expressly says that TiO2 is the only shielding material of a mineral nature, so this rules out Al as part of the filler and, at no time does it mention mixes of polymers or the use of HIPS as the polymer base for preparing the additive concentrate in fillers, so that it diverges from the invention presented. As in the case of the previous EP, it seems that the shields described do not achieve the virtually total levels of protection that can be obtained in the case at hand.

WO2007128085, "Preform and container for radiosensitive products and method for the manufacturing thereof"

This patent divulges an opaque preform intended to obtain a container with sufficient light protection to protect from radiations that damage sensitive products, specifically milk, so that the opacity is provided by a plastic additive when it is mixed with PET.

However, our particular case is totally different since the light shield is provided by the inorganic fillers that include TiO2 and Al, and HIPS alone, added to the PET base does not in any way provide the light shield required in the container. It does not mention the procedure for carrying it out nor does it envisage the use of a concentrated additive similar to that described in the invention being presented, in which the shield is provided by the inorganic fillers that contain TiO2 and Al. Furthermore it does not expressly mention HIPS as one of the possible light-shielding plastic additives either.

EP1318174 (A1) "Method of manufacture of polyester molding compositions and articles produced there from".

It refers to a container made in PET, with added rubber-type impact modifiers to increase the mechanical strength; it may include glass fibre or other mineral fillers to further increase strength, but neither the container nor its composition are intended for light shielding. Hence it is also considered to be in a different field to the case of the invention being presented.

JP 2004 058565. "Method for manufacturing container made of polyester resin"

It discloses a preform that is intended to produce a plastic container in which the polymer base corresponds to a mix of PET and polyolefins, in which, as a result of said polymer mix a plastic matrix is obtained in which the PET has lost part of its transparency ("semi-transparent") and that provides a "nacreous and glossy" appearance, presenting, as advantages, the semi-transparent, glossy, nacreous appearance of the container, as well as its good processability and mechanical strength; this glossy, nacreous appearance is the same as that mentioned in the US 2009 169786 patent. Al", already referred to, in which it is described for the mix of PET and PP (a good representative of polyolefins) However, the JP 2004 058565 document we are referring to does not mention added shielding fillers nor does it seek high light protection or cite HIPS included in the polymer mix or consider it the plastic base of a shielding filler concentrate.

Hence the aforementioned document is also considered to be different from the present invention.

FR2836893 (A1), "Container made from thermoplastic material for a product to be protected from light"

It discloses a bottle-type, opaque PET container with light shielding provided by a shielding filler that contains TiO2 and mica. But it does not mention any polymers other than PET contained in the final composition and the TiO2 content is under 4% by weight, which is less than the minimum described in the invention presented.

For the reasons stated, relating to the absence of HIPS and the low TiO2 content, it is considered outside the scope of the present invention.

WO/2002/074846, "Composites for railroad ties and other products"

Mentions a composition that contains PET, including recycled PET coming from post-consumer bottles, and elastomeric polymers that can be modified styrene polymers, amongst others. But it does not describe usage for the production of containers nor the use of HIPS as the mineral filler medium, nor does it intend to be a light shield to protect photosensitive substances.

EP 2 617 654, "Opaque single-layer container"

It mentions Al as the main shielding filler of an opaque container and, optionally, combinations of it with light absorbers. But the intended container does not have a conventional white colour since this would be impossible using Al as the main filler (it cites L* colours below 82 as the whitest colour achieved); it does not mention the use of HIPS in the concentrate that contains the shielding fillers, it does not even mention HIPS as one of the possible plastics in its mix with PET; neither does it mention TiO2 as the main shielding filler, nor the effects of Al in combination with the TiO2 main filler. Furthermore, the total shielding filler content is totally outside the ranges claimed in our invention (minimum 5% in our case, maximum 2% in EP 12 000 408.0).

DESCRIPTION OF THE INVENTION

This invention is presented with the aim of improving the current state of the art in the field of the production of white single-layer plastic containers with high light protection that require the incorporation of very high proportions of shielding fillers. As a result of this invention it is possible to obtain virtually absolute overall light shields (99.9% or more) in white single-layer containers with extraordinarily reduced weights, as well as to produce said containers with conventional moulding equipment and tools.

The container that is the object of this invention contains PET and HIPS in the plastic structure, and it contains titanium dioxide (TiO2) and metallic aluminium (Al) in the shielding fillers; so that the weight of PET is greater than that of HIPS in a ratio of between 10 and 50 (10<(weight of PET contained in the container)/(weight of HIPS contained in the container)>50), and so that the weight of TiO2 is greater than that of Al in a ratio of between 50 and 150 (50<(weight of TiO2 contained in the container)/(weight of Al contained in the container)>150). The container, in the absence of other specific pigments that may also be included in small proportions for an aesthetic function, will have an opaque, conventionally white appearance, as a result of the nature and proportions of the fillers it contains.

The procedure for preparing the container presented includes a operation of mixing a concentrated additive that contains HIPS and the aforementioned light shielding fillers with PET. The additive and the PET are in solid state when they are mixed and both are in the form of granules or micro-granules of opaque appearance. The mixture contains between 80% and 93% by weight of PET and between 7% and 20% by weight of additive, that is, the weight of PET divided by the total weight of the mixture is between 0.80 and 0.93 and the weight of the additive divided by the total weight of the mixture is between 0.07 and 0.20. Once the mixture of PET and the additive has been performed, in proportions chosen from among those cited for each, the mixture is heated to above the melting point of PET (250° C.), in specific equipment, until a mass is formed which is sufficiently fluid to be homogenised and plasticised; from this moment onwards the plastic matrix consists of a mixture of PET and HIPS and the shielding fillers that contain the TiO2 and the Al remain dispersed in said plastic matrix. The mixture formed in this way can be extruded and then thermoformed in moulding processes that can include compression, injection, blowing and cooling operations, which result in the container that is described being obtained.

The basic advantages of this invention derive, on the one hand from the efficient combination of TiO2 and Al contained in the shielding fillers, which allows total shields to be attained even in single-layer containers; and, on the other hand, from the contribution of the HIPS contained in the concentrate which facilitates the operations of adding the fillers and provides the main plastic PET matrix with enhanced structural characteristics when it incorporates high proportions of inorganic fillers.

The following table (Table 3) compares weights, shield performance and characteristics of different containers on the market, with some of the executions of the invention that is presented.

All of the containers compared have a capacity of 1 liter. The market containers are solutions for packaging long-life UHT milk.

In all of the cases the surface of the containers is white, with slight differences in L* colour, between 86 (in the case of three-layer PE) and 92 (in the case of two-layer PET); the L* colours of the three presentations of the invention are between 89 and 91.

TABLE 3

| Container | No. of layers | Capacity | Contents | Weight | Shield | % fillers | Material (plastic) |
|---|---|---|---|---|---|---|---|
| Market 1 | 3 | 1 L | UHT Milk | 28 G | >99.99% | 2 | PE |
| Market 2 | 3 | 1 L | UHT Milk | 30 G | >99.99% | 3 | PET |
| Market 3 | 2 | 1 L | UHT Milk | 24 G | >99.99% | 5 | PET |
| Market 4 | 1 | 1 L | UHT Milk | 31 G | 96% | 7 | PET |
| Market 5 | 1 | 1 L | UHT Milk | 28 G | 98% | 9 | PET |
| Invention 1 | 1 | 1 L | Multipurpose | 27 G | 96% | 6 | PET/HIPS |
| Invention 2 | 1 | 1 L | Multipurpose | 28 G | 99.9% | 11 | PET/HIPS |
| Invention 3 | 1 | 1 L | Multipurpose | 21 G | >99.9% | 12 | PET/HIPS |
| Invention 4 | 1 | 1 L | Multipurpose | 19 G | 99.9% | 13 | PET/HIPS |

The results shown in the previous table and the embodiments described for the invention illustrate the modularity of the solution presented and the possibility of obtaining total shields in extremely light single-layer containers; in fact, within the category of containers such as that described, there is no known lighter container with total light protection than that presented as embodiment 4 of the invention, not even with multi-layer structures.

The differentiating features of the invention presented lie in the excellent shielding properties provided by an adequate combination of TiO2 and Al and in the thermal and structural qualities of HIPS when mixed with the PET to form the container structure and in its use as a plastic base for the preparation of a concentrated additive in shielding fillers that contain TiO2 and Al. This concentrated additive will be incorporated into the main plastic PET stream as part of the operations to make the container. As a result of said combination, high amounts of fillers (up to 14%) can be added to the described thermoplastic structural base to provide practically total light shields (up to 99.9% global shielding) even in extraordinarily light single-layer containers.

The concentrated additive which contains HIPS and inorganic shielding fillers, contains TiO2 as the main component, normally in a concentration by weight, with regards to total weight, of between 50% and 70%, preferably between 55% and 65%; the Al is contained in the concentrated additive in such a proportion that the ratio resulting from dividing the weight of TiO2 by the weight of the Al is higher than 50 and lower than 150; the HIPS contained in the concentrate is between 30% and 50%, by weight of HIPS in relation to total weight of the concentrate; the concentrated additive may additionally contain other substances that facilitate the preparation process such as, for example, dispersing agents; furthermore, although it is not the preferred case for preparation, the concentrate may additionally contain small amounts of pigments if the colour of the container is to be customized. In the absence of these pigments the container will be white and opaque as a natural consequence of the described combination of shielding fillers. The process to prepare the concentrate includes operations of mixing, plasticization, homogenisation, extrusion and pelletizing so that its final presentation is that of solid-state, opaque granules or microgranules, in which the shielding fillers are dispersed in the HIPS base. In this way the concentrated additive is ready for metering and mixing with the PET base in a suitable proportion for the final application that the container will have, normally said additive dose being between 7% and 20% by concentrate weight in relation to weight of PET+concentrate.

The process presented to produce the container involves an operation consisting of incorporating the concentrated additive, containing HIPS and the shielding fillers, in the main plastic PET stream. The TiO2 and Al contained in the shielding fillers play an essential role in the possibility of obtaining unusually high levels of shielding in containers of the type described, given that high proportions of fillers are allowable with this combination without the colour of the end container being negatively affected. As a carrier of the shielding fillers, the HIPS fulfils the fundamental mission to facilitate the dosing of high proportions of said fillers (which are necessary to achieve very high levels of light shielding) into the main plastic PET stream, preventing the additive from drying and allowing to maintain the usual PET processing conditions; furthermore the HIPS behaves in conjunction with the PET in the container-thermoforming processes and improves the structural characteristics of the plastic base giving the PET a more amorphous nature, facilitating dispersion of the fillers and broadening the process window in blow-moulding. Dosing of the concentrated additive into the PET stream is performed using a dosing unit, which is usually gravimetric, of the type cited for processing "master batches". As already indicated, the HIPS allows the use of this type of dosing unit, which is normally designed for lower dosages than those that we are concerned with, thanks to the thermal and hygroscopic characteristics of the HIPS.

When dosing the additive it is in a solid state, in the form of opaque granules or microgranules; the PET is dry and also in a solid state, in the form of opaque granules. Normally, immediately before mixing both streams (PET and additive) in a solid state, the PET shall be hot, at a temperature of between 100° C. and 160° C. and the additive can be at ambient temperature as it does not need to be dried before mixing. Immediately after dosing the additive to the PET stream, the mix is incorporated in an extruder or plasticizing chamber in which it will be melted and homogenised to allow the subsequent moulding processes.

Dosing of the additive to the PET will be carried out in a proportion of between 7% and 20% by weight of additive in relation to total PET+additive weight.

The invention permits great modularity in light shielding levels in containers, making it possible to optimize the filler content that is needed to achieve the performance required by the end application.

The following table (Table 4) indicates the range in modularity that can be achieved with this invention and shows how, thanks to this invention, it is possible to produce single-layer containers, which to date had proved unobtainable, with the added value that the highest levels of functional requirements (virtually total shielding) can be achieved while at the same time satisfying the economic engagement (extraordinarily light containers).

TABLE 4

| Container | Weight | additive % | fillers % | TiO2/Al | PET/HIPS | Shielding % |
|---|---|---|---|---|---|---|
| 1 | 27 | 7 | 5 | 150 | 43 | 90 |
| 2 | 27 | 7 | 5 | 60 | 44 | 96 |
| 3 | 28 | 20 | 13 | 60 | 12 | >99.9 |
| 4 | 28 | 20 | 11 | 60 | 10 | 99.9 |
| 5 | 19 | 20 | 13 | 50 | 13 | >99.9 |

The following conclusions can be drawn from the experimental data cited.

The influencing factors in the level of shielding, at equal or similar container weight and format, are the % of shielding fillers contained in the container and the TiO2/Al ratio.

The proportion of fillers contained in the container can be adjusted in two ways: by the concentration of shielding fillers contained in the concentrated additive and by the % of additive incorporated in the PET. (Containers 2 vs. 3 and 3 vs. 4, respectively)

The TiO2/Al ratio, at an equal % of shielding fillers contained in the container, has a great influence on the shielding level and does not significantly affect the rest of the container's attributes. (Containers 1 vs. 2).

The weight of the container, in the implementation of the present invention for high % of shielding fillers contained in the container and for low TiO2/Al ratios, is no longer a limiting factor in the light shielding level that can be achieved in the containers. (Containers 3 vs. 5).

The shielding percentages cited refer to the light intensity that is incorporated into each container under incidental external lighting of 2300 LUX intensity·((shielding %)= ((external LUX−container LUX)/(external LUX))×100).

ADVANTAGES OF THE INVENTION

The advantages of PET are well documented as a material for making preforms and containers, due to its processability, recyclability, moderate cost, food safety and easy availability, amongst others.

Furthermore, when used to package sensitive products which normally require the incorporation of fillers and/or pigments to the main PET matrix, an advantageous mode of incorporation is that of concentrating the pigments and fillers, that will provide the desired functional qualities, in solid or liquid carriers that are then added over the PET base in the form of additives, in the desired proportions. Although incorporating additives during polymerization affords solutions robustness and simplicity of use, it is not always possible nor desirable to proceed in this way due to the complexity of the process, lack of modularity in the final solution, logistic difficulties, cost, or simply because of unviable PET reactive processes in the presence of certain agents or additives. Furthermore, when very high concentrations of fillers, pigments or additives have to be used to achieve the required performance (for example mineral filler concentrations above 7 or 8%), the difficulties of addition increase to such a degree that on many occasions they are practically unviable.

As already stated, the differentiating quality of the invention is that it allows single-layer containers to be obtained with a very versatile level of light shielding, up to a virtually total shielding level in extremely light containers, maintaining a conventionally white colour in them and all of this using conventional equipment and processes. This is possible thanks to the following advantages that are afforded both by the particular combination of shielding fillers that contain TiO2 and Al, and by the incorporation of the HIPS, contained in the concentrated additive:

1. Advantages afforded by the combination of light shielding fillers: due to the fact that Al combined with the TiO2 provides shielding by reflecting light and not absorbing light, the following is possible, as set out in tables 1 to 4:

Maintaining white colours in containers with content ratios of TiO2 and Al that are highly efficient in terms of their shielding function.

Incorporating high contents of fillers without the container colour being adversely affected.

A notable independence between the container wall thickness, as a result of its weight, and the shielding level afforded by a given composition. This is so, because in the type of light shielding that is based on reflecting rather than absorbing light, it is the composition of the surface, not the thickness of the wall of the container that is the key influencing factor in shielding performance.

2. Advantages afforded by the HIPS contained in the concentrated additive:

It is an excellent carrier for inorganic shielding fillers: Since it allows concentrations of these that are sufficiently high to optimize the cost of the PET additive and it simplifies addition processes due to its non-hygroscopic nature, its amorphous character and its relatively high Tg.

When combined with PET, once the concentrated additive that the HIPS contains is mixed with it, it provides improvements in the plastic structure of the container.

Details of the advantageous contributions cited for HIPS are given below, it is compared with other polymers, and the selection criteria are explained.

1. Non-hygroscopic polymer base: the additive percentages described in the present invention (between 5% and 20%), are sufficiently high for a hygroscopic polymer base to incorporate sufficient moisture to the PET matrix to degrade it if the additive is not dried prior to mixing, which would have to be performed in different installations and under different conditions to those used for the base PET, since if it is carried out jointly, the mix of PET+additive will produce separations due to the effect of the different densities and/or agglomerations, due to the materials having different thermal behaviours (PET dries at a temperature of around 170° which is high enough to surpass the softening and/or melt temperatures of many polymers, resulting in it being materially impossible to achieve stable processing and a homogeneous composition. This pre-drying and separation of the concentrate would involve hefty investments in equipment which conventional facilities do not normally have, making the application more expensive and resulting in considerable difficulties in installations and processes. A "non-hygroscopic" polymer is considered to be one with a maximum moisture absorption capacity of less than 0.1% of its weight, thus the potentially viable maximum incorporation of moisture by the base polymer of the concentrate is less than 0.01% water in the total mass (PET+additive), since with a higher % of moisture PET will degrade hydrolytically in its melted phase, during the plasticizing process.

In the description of the invention a composition is cited that incorporates, at the most, 10% HIPS, which has a maximum hygroscopic capacity of 0.07% (less than 0.1%). Assuming this maximum of 10% HIPS and assuming that it is completely moisture-saturated, the maximum possible percentage of water introduced in the application described would be 0.007%. Thus, it is perfectly possible to avoid drying if HIPS is used as the polymer base of the concentrate which contains the mineral fillers.

For example, if PET itself were to be used as the polymer base of the concentrate, bearing in mind that it has a maximum hygroscopic capacity of more than 0.4%, using the same criterion of maximum concentration (10%) of PET added to the base PET and assuming hygroscopic saturation (which would be normal in the absence of drying), the proportion of water incorporated into the total mass would be 0.04%, which is greatly in excess of the acceptable percentage to avoid hydrolytic degradation, and would break the polymer chains and cause an uncontrollable descent in viscosity.

2. Amorphous structure: this attribute affords three advantages relating to the absence of crystalline regions in the polymer base of the concentrate:

An amorphous polymer does not have a fixed melting point. This is very important in the case in hand, given that mixing the base PET and the concentrated additive is carried out at a hot point of the installation, more specifically, at the exit of the base PET from the dryer, prior to the materials being plasticized, at a temperature that is normally above 150° C., which is higher than the melting point of some materials, such as polyolefins and other semi-crystalline plastics. If the base material of the concentrate were to melt at the time of mixing it would form a doughy mass with the PET and this would make it impossible for the materials to enter the plasticizing system, thus rendering the process unviable. If we avoid this by choosing a material that does not melt, such as HIPS, it would be enough to have a suitable Tg and a structure that is sufficiently robust to avoid the problem described and make the process viable in normal working conditions for PET.

Furthermore, one of the chief problems that occurs in PET preforms and bottles that have a great tendency to crystallize with high mineral filler contents, such is the case of TiO2, is that crystalline regions in preforms prevent blowing, which increases losses due to non-quality and hinders processes. Crystallization, that can be easily seen in transparent preforms due to the fact that it produces opaque whitish areas, remains totally concealed in opaque preforms and is not detected until the preforms are blown, the problem becoming worse when the containers are blown. If we add to this that PET will crystallize even faster when it is accompanied by TiO2 or other inorganic fillers given that they act as nucleating agents and crystallization accelerants, ensuring a more amorphous base composition is a key advantage. The attached figures show DSC spectra, comparing PET and different PET mixtures with other polymers, including HIPS, in which the strong tendency towards a more amorphous structure can be clearly seen when HIPS is added in proportions that are within the ranges described in this invention.

The following table (Table 5) shows the % of shrinkage in containers with the same filler (9% TiO2) and mixtures of different polymers with the PET; this parameter (shrinkage %) is very important since contractions that are different from those of PET, rendered only by mixtures, would mean that the formulae for calculating the dimensions of moulds would have to be altered in relation to those already known and used for PET.

TABLE 5

| MATERIAL | FILLER % | SHRINKAGE % |
|---|---|---|
| PET | 9 | 0.5 |
| PET + 8% HIPS | 9 | 0.5 |
| PET + 8% PA | 9 | 0.6 |
| PET + 8% PE | 9 | 0.6 |
| PET + 8% PP | 9 | 0.7 |

As can be seen, HIPS does not introduce any variations whilst other polymers that are less miscible (or compatible) with PET, such as polyamide-6 (PA), polyethylene (PE) and essentially polypropylene (PP) cause greater contractions than those of only PET.

3. Glass transition temperature (Tg): this is the temperature at which a thermoplastic polymer softens to a sufficient extent to acquire a viscous behaviour. In the plastic sought it must be.

High enough (above that of PET) to guarantee a sufficiently stable solid structure when mixed with the hot PET at the moment when the concentrate is added, to avoid the sticking problems already referred to, which would impede the solution being applied reasonably in industry.

It must not be too far from the Tg of PET in order to allow joint moulding of both polymers since, as already indicated, an essential function of the polymer base of the additive is to form, along with PET, the structural base of the container. Examples of polymers that are perfectly blow-mouldable but which have a Tg that is considered to be too far away from that of PET, either because it is too low or too high, are polyolefins (Tg under 0° C.) or PC (Tg>140° C.).

HIPS complies with these two requirements perfectly since its Tg of around 90° C. is above that of PET, but close to it and below the normal heating temperature of PET preforms in the blowing process, which would allow joint moulding with PET.

4. Resistance to impacts: this is especially important since one of the qualities of PET bottles is precisely their lack of fragility and resistance to breakage by impact; this quality must not be negatively altered by the effect of incorporating fillers or additives. Unfortunately, it is widely known in the trade that high amounts of additives incorporated in PET frequently worsen this appreciated virtue of the material.

5. Elongation capacity: all thermoplastic materials have, albeit with very important differences between them, a stretch limit that may not be surpassed without producing negative effects on the final structure, either due to breakage, undesired crystallization, fragility or a change in appearance. Given that in order to form a bottle by blowing there must necessarily be a stretching of the material, whether using a preform or an extruded parison, and given that in the case of blowing preforms with additives or mixtures of materials, the elongation capacity becomes critical, because excessive stretching may result in delaminations and heterogeneities in the structures, it is very important to select a polymer as the base for the concentrated additive in fillers that does not worsen the stretching capacity characteristics of the base PET. Some polymers such as PS and some semi-crystalline PA, although they have other good qualities from amongst those previously mentioned, could prevent preform blowing due to their low resistance and stretching capacity. HIPS has a stretching capacity (in accordance with standard ISO 527-2 tests) that is up to four times greater than that of PET (>60 vs. 15 of PET). Thus, as has been demonstrated in real bottle blowing tests using preforms under forced process conditions, HIPS considerably improves the stretching capacity of PET.

6. Miscibility: there may be different degrees of compatibility between mixtures of different families of polymers without the degree of compatibility between those that are and those that are not compatible being able to be categorically characterized; however there is a consensus regarding two criteria that can be used in a measurable way to assess the degree of miscibility between polymers. These two criteria are: the degree of opacity of a mixture and thermal transitions splits on calorimetric graphs, such as differential scanning calorimetry (DSC). These are the criteria that we have chosen to evaluate this aspect, so that from this point of view and referring to polymers other than PET (PET is naturally compatible with itself), we will rate as more suitable those that display the greatest degree of affinity, which results in less opacity in the mixture and in a DSC of the mixture that does not have thermal transition splits. Greater compatibility will be preferred to avoid mixing and processing problems in the implementation described.

The following table (Table 5) provides a comparison of different plastics and includes the aforementioned attributes as well as others, in such a way that, the different attributes presented have been rated with values from −2 (worst score) to +2 (best score) as a basis of the selection criterion of HIPS as the polymer that is considered to be most appropriate as the polymer base of the concentrated additive that contains the shielding fillers.

TABLE 6

| | PET | PETG | PA(6) | PE | PP | PBT | PS | PC | HIPS |
|---|---|---|---|---|---|---|---|---|---|
| Hygroscopy (max % of moisture) | −1 | −1 | −2 | 2 | 2 | −1 | 2 | −2 | 1 |
| Amorphous nature | −1 | 2 | −1 | −1 | −1 | −1 | 1 | 1 | 1 |
| Tg | 0 | 0 | 0 | −1 | −1 | 0 | 1 | 1 | 1 |
| Tm | 0 | 1 | 0 | −1 | 0 | 0 | 1 | 1 | 1 |
| Processability (injection and blowing) | 0 | −1 | 0 | 0 | 1 | 1 | −1 | −1 | 1 |
| Break strength | 2 | 2 | −1 | 2 | 2 | 2 | −2 | 2 | 2 |
| Elongation (% ISO 527-2) | 1 | 2 | 2 | 2 | 2 | 1 | −2 | 1 | 1 |
| Miscibility | 2 | 0 | −1 | −1 | −1 | 2 | 0 | 0 | 1 |
| Cost | 1 | −2 | −1 | 2 | 2 | −1 | 0 | −2 | 0 |
| TOTAL: | 4 | 3 | −5 | 4 | 6 | 1 | 0 | 0 | 10 |

Criteria of Appraisal and Interpretation of the Table

Each of the compared thermoplastics is rated in relation to each concept evaluated, all of the thermoplastics being potential candidates for their common usage in the production of hollow parts and containers, with a scale of between −2 (worst score) and +2 (best score). A negative score (less than 0) for any of the aspects evaluated does not rule out the possibility of use since all of them have advantages and drawbacks in one aspect or another. Processability logically relates to all of the aspects evaluated except for cost; for this reason it is logical that the score differences "level out", given that as has been mentioned, all of them are processable with differing degrees of difficulty and none of them is perfect in all aspects.

1. Hygroscopy: a negative evaluation for those with a water-absorption capacity greater than 0.1% (they would require drying before mixing and plasticizing) and a positive evaluation for those that have a water absorption capacity of less than 0.1%; the differences between (−) and (+) values are assessed using quantitative criteria (PE and PP are the least hygroscopic and PA is the most hygroscopic)
2. Amorphous nature: (+) those that are amorphous "per se", (−) those that are "per se" semi-crystalline; however, the greater or lesser amorphous nature that they cause when mixed with PET is also rated
3. Tg: 0 for those that have a Tg that is equal or close to that of PET; −1 for those that have a Tg lower than PET; +1 for those that have a Tg greater than PET
4. Tm: +1 for those that do not have a Tm (amorphous); 0 for those that, although they are semi-crystalline, have a Tm that is greater than the crystallization temperature (that approximately coincides with the drying temperature) of PET; −1 for those which, in addition to having a Tm, said temperature is lower than that of PET crystallization and drying (this is the case of PE).
5. Processability: all of the processes involved in producing containers have been taken into account in empirical tests (drying requirement, additivation and mixing, extruding and plasticizing in melted state, injection, moulding and blowing . . . ).
6. Break strength: in controlled drop tests at 2.5 m, performed out with 1.0 liter containers full of water, the number of broken bottles out of a total of 25 has been evaluated. +2, no breakages; −1, 2 or less breakages; −2, 3 or more breakages.
7. Elongation: standardised test (ISO 572-2 or ASTM 638) indicates the % of stretching that an injected test specimen can withstand before breaking and gives an idea of the stretching capacity of the materials. Values lower than those of PET (15% according to ISO) are unacceptable and are awarded a score of −2 (only in the case of PS, with 2%, and very poor in this respect). Values higher than PET are considered positive and are awarded a score of +1 for between 15% and 100% and +2 when they are above 188% (which is the case of PE, the best in this respect).
8. Miscibility: as an idea of the degree of solidarity between PET and the rest of the materials, polyesters obtain the maximum score and the rest depending on the degree of miscibility, shown by DSC curves (thermal transition split) and opacity of mixtures, so that the less opacity and lack of splits is, the higher the score is. See attached figures.
9. Cost: important aspect that will influence the economic and commercial viability of the solution of the concentrated additive that contains the shielding fillers and the polymer in which they are dispersed.

Result: in line with the criteria described for the purpose of the invention that is presented, HIPS is the best and is clearly at a distance from the rest of the plastics compared. This evaluation is only valid for the intended purpose and does not relate in any way to the suitability of plastics in other applications.

PREFERRED EMBODIMENT OF THE INVENTION

The single-layer opaque container that is the subject matter of this invention contains a thermoplastic matrix that enables the container to be moulded and its shape and physical structure to be constituted in such a way that this plastic matrix contains polyethylene terephthalate (PET) and high impact polystyrene (HIPS); and it also contains at least two opacifying inorganic fillers that fulfil a light-shielding function, in such a way that said inorganic fillers contain titanium dioxide (TiO2 and metallic aluminium (Al).

The implementation of the invention comprises a processes in which a concentrated additive that contains HIPS, TiO2 and Al, is added to PET in a proportion of between 7% and 20% by weight of concentrated additive vs. total weight of the final composition. This operation is similar to the usual operations to incorporate colouring agents or other additives to PET in a master-batch form by means of readily available dosing units, except that, in our case, the proportions of additive are comparatively very high in relation to those required, for example, to colour PET (usually between 1 and 2%). The high percentage dosage required for the implementation of our invention is due to the high ratio of inorganic shielding fillers needed to achieve the light shielding levels required by the container that is described (always above 90%; normally above 95%, and achievable up to 99.9% or virtually absolute). Dosing of the concentrate for its mixing with PET was successfully performed, preferably adding the concentrated additive at a point between the exit of the PET from a drying-dehumidifying unit and the entry of the materials into the chamber for mixing, plasticizing and extrusion of the melted mass prior to injecting preforms.

Furthermore, and as described, due to the high level of additivation it is advisable to find an adequate plastic medium, both to guarantee the operation of adding the fillers and to form a suitable structural base in the container. As previously seen in our case, HIPS has been found to be a particularly suitable material vis-a-vis other possible materials.

Adequately selecting and combining the inorganic shielding fillers is also a determining factor for the success of the solution. TiO2 is a high-shielding material; it is well-known and affordable, providing a conventionally accepted white colour in containers (L* colours>86 on the Cie-L*a*b* scale, measured on the surface of the containers by reflection technique are considered conventionally acceptable) However, given that in our case virtually absolute shielding is sought, TiO2 alone would require such high dosages that industrial operation would be enormously difficult and it would be too expensive. There are other well-known combination options, such as the adding light-absorbing agents, normally black; but this, in a single-layer container in which large quantities of absorbing agent would be required, results in a undesirable greyish appearance and dulls the attractive gloss that TiO2 gives the containers. Thus, as an efficient complement to the light shield, a light-reflecting material has been sought; furthermore it must be easily dispersible, affordable, commonly used and, preferably, provide even shielding by reflection over the whole of the spectrum, without specific reflection peaks at different wavelengths, so as not to alter the colour of the container surface to any notable extent. In this regard, it is the ratio of TiO2/Al which will determine the compromise between shield and colour.

The ratio between the TiO2 and the Al selected, in a range (weight of TiO2)/(weight of Al) of between 50 and 150, is sufficient to achieve the most ambitious objective of virtually total light protection in single-layer containers with conventional weights. TiO2/Al weight ratios greater than 150 are inefficient and values of less than 50 are not necessary in perfectly implementable realizations that fulfil the objective of total shielding, as already outlined. Furthermore, a specific ratio between the weights of the main inorganic shielding fillers, in our case TiO2 and Al, determines the specific shielding potential of the composition, so that for a given ratio, the level of shielding of a container can be predicted with sufficient accuracy and it is easy to deduce the amount of fillers that are necessary to provide the shielding that is sought for a specific container.

With regards to the PET/HIPS weight ratio, PET will always be the main component and the ratio of HIPS must meet two essential requirements: firstly it must serve as a vehicle for the fillers contained in the concentrated additive in a functional and economically reasonable proportion and secondly, its contribution to the structural plastic matrix is desirable to afford it a more amorphous character than that obtained with PET alone; in this regard, calorimetric measurements have been performed to determine the specific crystallization heat of plastic matrixes with different PET/HIPS ratios and other plastics. Since the samples used are ones which have undergone forced freezing from melted material, they are in their amorphous state when the test is initiated so that a lower specific heat of crystallization indicates a less marked tendency to crystallize (more amorphous nature). The tests performed indicate that the presence of HIPS inhibits the tendency of PET to crystallize, which is always useful and even more so in the presence of fillers, since in this case PET has a much greater tendency to crystallize when it contains them. In spite of the generally useful effect of the mix of PET/HIPS, it is considered advisable to delimit technically and economically viable ratios. With above 70% of fillers in the concentrate (less than 30% HIPS) dispersion problems start to occur and thus it is not considered acceptable, and with under 50% of fillers, the dosing needed to reach absolute shield levels in lightweight containers would not be advantageous from an economic point of view. Hence: maximum PET/HIPS ratio (low load and high dose): PET/HIPS ratio between 8 and 10; and for a high load (70%) and low dose (7%), PET/HIPS ratio above 30. Hence, the limits are determined between 10 and 50.

Having identified suitable, viable ratios, both for the TiO2 vs. Al contained in the shielding fillers, and for PET vs. HIPS contained in the structural plastic matrix, it is necessary to make sure that the preparation of the concentrate is viable, bearing in mind the compromise between the sufficient functional contribution and the economic viability of the solution. In this regard a required dose of concentrated additive that is greater than 20% by weight of concentrated additive in relation to the total weight of the container, is considered to be excessive, given that the higher the dose, the greater the processing costs are. It is considered viable to produce concentrates containing HIPS, TiO2 and Al, in which the weight of the TiO2+Al is between 50% (less concentration of TiO2 in the concentrate would require excessively high doses to attain virtually absolute shields, with the ultimate negative economic effect) and 70% (above 70% of inorganic fillers difficulties have been encountered with regard to dispersion and inefficient processes); preferably, concentrations of inorganic fillers containing around 60% TiO2 and Al, and concentrations of HIPS of between 35% and 40% have been used in the concentrate. The following are examples of embodiments of containers blown from preforms, in which a concentrate is used that contains fillers that include between 55% and 65% of TiO2 and Al by weight and a thermoplastic matrix that contains 35% and 45% HIPS by weight. Adding the concentrate to the plastic PET base contained in the container has been performed in the manner already indicated, with an additive dose of between 80% and 93%. As can be seen in the examples, the invention that is presented is perfectly viable in the mode in which it has been described.

Consequently, we relate a single-layer container that contains a structural thermoplastic matrix and at least two opacifying inorganic fillers with a light-shielding function, dispersed in the thermoplastic matrix, in such a way that the thermoplastic matrix contains PET and HIPS in a weight ratio (PET/HIPS) of between 10 and 50 and which also contains TiO2 and Al in a weight ratio (TiO2/Al) of between 50 and 150; so that PET is contained in a proportion of between 80% and 93%, by weight of PET in relation to the total weight of the container and TiO2 is contained in a proportion of between 5% and 14% by weight of TiO2 in relation to the total weight of the container.

EXAMPLES

Example 1 (Table 3—Invention 1)

By means of adding and mixing a 9% concentrate with standard PET ((0.09=weight of concentrate/(weight of PET+weight of concentrate)); so that the concentrate contains 65% by weight of inorganic shielding fillers in which the TiO2/Al ratio=100. The % of PET by weight included in the container is 91%, the weight of TiO2 included in the container is 5.8% and the PET/HIPS ratio=32.

The result is an opaque white bottle of 1 liter capacity and a total weight of 27 g, with a 96% coverage shield. It is a container with a sufficient shield to preserve sensitive foods for moderate periods of times, for example ESL milk, for a period of 3 or 4 weeks.

Example 2 (Table 3—Invention 2)

By means of the adding a 17% concentrate to standard PET ((0.17=weight of concentrate/(weight of PET+weight of concentrate)); so that the concentrate contains 65% by weight of inorganic shielding fillers in which the TiO2/Al ratio=75. The % of PET by weight contained in the container is 83%, the weight of TiO2 contained in the container is 10.9% and the PET/HIPS ratio=15.

The result is an opaque white bottle of 1 liter capacity and a weight of 28 g, with a very high shield (99.9%) which is sufficient to preserve very sensitive foods for a long period of time, for example UHT milk for a period of more than four months.

Example 3 (Table 3—Invention 3)

By means of adding a 20% concentrate to standard PET ((0.2=weight of concentrate/(weight of PET+weight of concentrate)); so that the concentrate contains 60% by weight of inorganic shielding fillers in which the TiO2/Al ratio=60. The % of PET by weight contained in the container is 80%, the weight of TiO2 contained in the container is 11.8% and the PET/HIPS ratio=11.

The result is an opaque white bottle of 1 liter capacity and a total weight of 21 g, with total shield (>99.9%). This experiment shows the possibility, via the application of this invention, of reducing the weight of a single-layer bottle with a practically total shield, by up to 25% in relation to a more conventional one (example 2), increasing the shielding filler content by less than 10% by weight.

Example 4 (Table 3—Invention 4)

By means of adding a 20% concentrate to standard PET ((0.2=weight of concentrate/(weight of PET+weight of concentrate)); so that the concentrate contains 65% of inorganic shielding fillers in which the TiO2/Al ratio=60. The % of PET by weight contained in the container is 80%, the weight of TiO2 contained in the container is 12.8% and the PET/HIPS ratio=13.

The result is the lightest 1-liter, single-layer bottle known (19 g), white in colour, with a virtually total light shield, which shows the valuable contribution of this invention to the current state of the art.

Example 5 (Table 1 Containers)

This series of experiments has evaluated the efficacy of the TiO2 and Al combination contained in the shielding fillers (in a ratio of TiO2 weight vs. Al weight of between 50 and 150) compared to a conventional solution based on the combination of TiO2 with a black light absorber (in this case iron oxide). The objective is to maintain an L* colour that is as high as possible and, in any event, an L* colour>86 (conventionally white).

Containers 1 to 9.

All of the experiments have been carried out on containers in which the following parameters and attributes have remained notably constant:
  Format and method of production: 1-liter capacity, single-layer bottles, with a weight of around 28 g, made using the same moulding tools and in a way in which incorporation of the shielding fillers has always been carried out using a concentrated additive containing HIPS (between 36 and 36.5% by weight of HIPS in relation to weight of concentrate) and TiO2 (between 59.5 and 60% by weight of TiO2 in relation to weight of concentrate), which has been dosed and mixed with a flow of standard PET, previously dehumified.
  Additive dose: 17% of additive added to PET, by weight of additive vs. weigh of PET+additive.
  Total filler content: approximately 10% (between 10% and 10.4%) the main component contained in the shielding fillers being, in all cases, TiO2.
  % of PET contained in the containers: around 83%, by weight of PET vs. container weight.
  % TiO2 contained in the container: around 10% (between 9.9% and 10.3%) by weight of TiO2 vs. weight of container.
  PET/HIPS weight ratio: around 13, very approximately, in all cases.
  Containers 1 to 4.
  In this series of experiments only the weight ratio of TiO2 vs. light absorber (iron oxide) has been altered from one to another container, so that the (TiO2 weight)/(absorber weight) ratio has been between 340 and 145. It can be seen in Table 1 that, as the TiO2/Absorber ratio decreases, the level of shielding increases (greater shielding %) and contrarily, the L*colour diminishes systematically and drastically, making the container notably darker. The fact that the L*colour gets darker as the shield is increased at the expense of a greater proportion of absorber in the container, typical behaviour of conventional solutions with shielding fillers based on combinations of TiO2 and light absorbers, is determining in the enormous difficulty of achieving total shields in white containers with economically viable weights and it explains why, to date, there have been no commercial solutions available for this type of container in a single-layer format.

Containers 5 to 9.

They differ from the previous series (1 to 4) in that the light absorber has been replaced by a light reflector (Al) and the containers 5 to 9 have only been altered, from one to another, in terms of the ratio by weight of TiO2 vs. Al, so that the (weight of TiO2)/(weight of Al) ratio has been between 147 and 54. It can be seen in Table 1 that as the TiO2/Al ratio decreases the level of shielding increases (greater % of shielding), without the L* colour diminishing systematically, it remaining practically stable. This possibility of maintaining high L* colour values (notably white containers) regardless of the proportion of Al included and the container shield, determines the possibility, by putting into practice the present invention, to achieve absolute light shields in conventionally white and economically advantageous single-layer containers; this was not possible prior to this invention.

Example 6 (Containers 1 to 7—Table 2)

This series of tests, indicated in table 2, show the surprising effect that results in an even whiter container colour (higher L*colour) as the % of shielding fillers contained in the container is increased, for the same weight ratio of TiO2 and Al contained in the shielding fillers (weight of TiO2/weight of Al=60 in all of the cases 1 to 7).

All of the containers are 1-liter single-layer bottles of an identical shape and the guideline for adding the concentrate to the PET in the sequence expressed from 1 to 7 has been as follows:

Container 1: Addition over standard PET, of 9% (by weight of additive in relation to the weight of the additive plus that of PET) of an additive that contains 60% TiO2 (by weight of TiO2 in relation to the total weight of the additive that contains it).

Container 2: Addition over standard PET, of 12% by weight of an additive that contains 65% by weight of TiO2.

Container 3: Addition over standard PET, of 16% by weight of an additive that contains 60% by weight of TiO2.

Container 4: Addition over standard PET, of 17% by weight of an additive that contains 60% by weight TiO2.

Container 5: Addition over standard PET, of 18% by weight of an additive that contains 60% by weight TiO2.

Container 6: Addition over standard PET, of 19% by weight of an additive that contains 65% by weight TiO2.

Container 7: Addition over standard PET, of 20% by weight of an additive that contains 65% by weight TiO2.

If the percentages of TiO2 are related to the L*colours of the corresponding containers, a direct, practically linear relationship between the two parameters can be obtained; so that, for a fixed weight ratio between the TiO2 and Al contained in the container, it is possible to predict, with good approximation, the colour that, for a given shield and given TiO2 content, will be obtained in a given container. The fact that the colour becomes whiter as the TiO2 increases, supports the possibility of obtaining, with the implementation of the present invention, a single-layer container with a notably white colour and with a total shield.

Example 7

Another alternative embodiment of the invention, although not a preferred one, has been tested using non-conventional PET in which shielding fillers containing TiO2 as the main filler have been previously dispersed.

The PET used as the base in this experiment comprises 5% by weight of TiO2. A 1-liter bottle weighing 27 g produced using this PET base and without any other additives, affords a 90% level of shield.

This embodiment of the invention was performed adding over the PET base containing 5% by weight of TiO2, 10% by weight of concentrated additive containing HIPS, TiO2 and Al; the concentrated additive being such that it contains 60% by weight of TiO2 and the weight ratio of TiO2/Al=50. The same 1 liter container as described in the previous case, made in this way in accordance with the invention, has the following characteristics, thanks to the adding of the concentrate:

Weight: 28 grs.
TiO2 contained: 11%
PET contained: 85%
PET/HIPS weight ratio: 23
TiO2/Al weight ratio: 90
Shielding %: >99%

Other examples of the application of the present invention are those of the containers described in table 4. Containers 1 to 5 of said table are single-layer bottles, the implementation of which has involved, as in the previous examples, processes of adding and mixing concentrates with PET, in this case, once again with standard PET, in such a way that the additives contain HIPS, TiO2 and Al and the TiO2/Al weight ratios are different for each of said bottles. The characteristics of the concentrated additives involved in achieving each one of the containers in table 4 are as follows:

Container 1: the concentrated additive contains 31% HIPS and it contains 65% light shielding fillers, said percentages being expressed in weight of HIPS and fillers in relation to the total weight of the additive, respectively; in such a way that the ratio obtained from dividing the weight of TiO2 by the weight of Al contained in the shielding fillers is 150 (TiO2 weight/Al weight)=150).

Containers 2 and 3: the concentrated additive contains 31% by weight HIPS and it contains 65% by weight of light shielding fillers, in such a way that the ratio obtained by dividing the weight of TiO2 by the weight of Al contained in the shielding fillers is 60 (TiO2 weight/Al weight)=60).

Container 4: the concentrated additive contains 41% by weight HIPS and it contains 65% by weight light shielding fillers, in such a way that the ratio obtained by dividing the weight of TiO2 by the weight of Al contained in the shielding fillers is 60.

Container 5: the concentrated additive contains 31% by weight HIPS and it contains 65% by weight light shielding fillers, in such a way that the ratio obtained by dividing the weight of TiO2 by the weight of Al contained in the shielding fillers is 50.

EXPLANATION OF FIGURES

FIG. 1.

Figure 3:
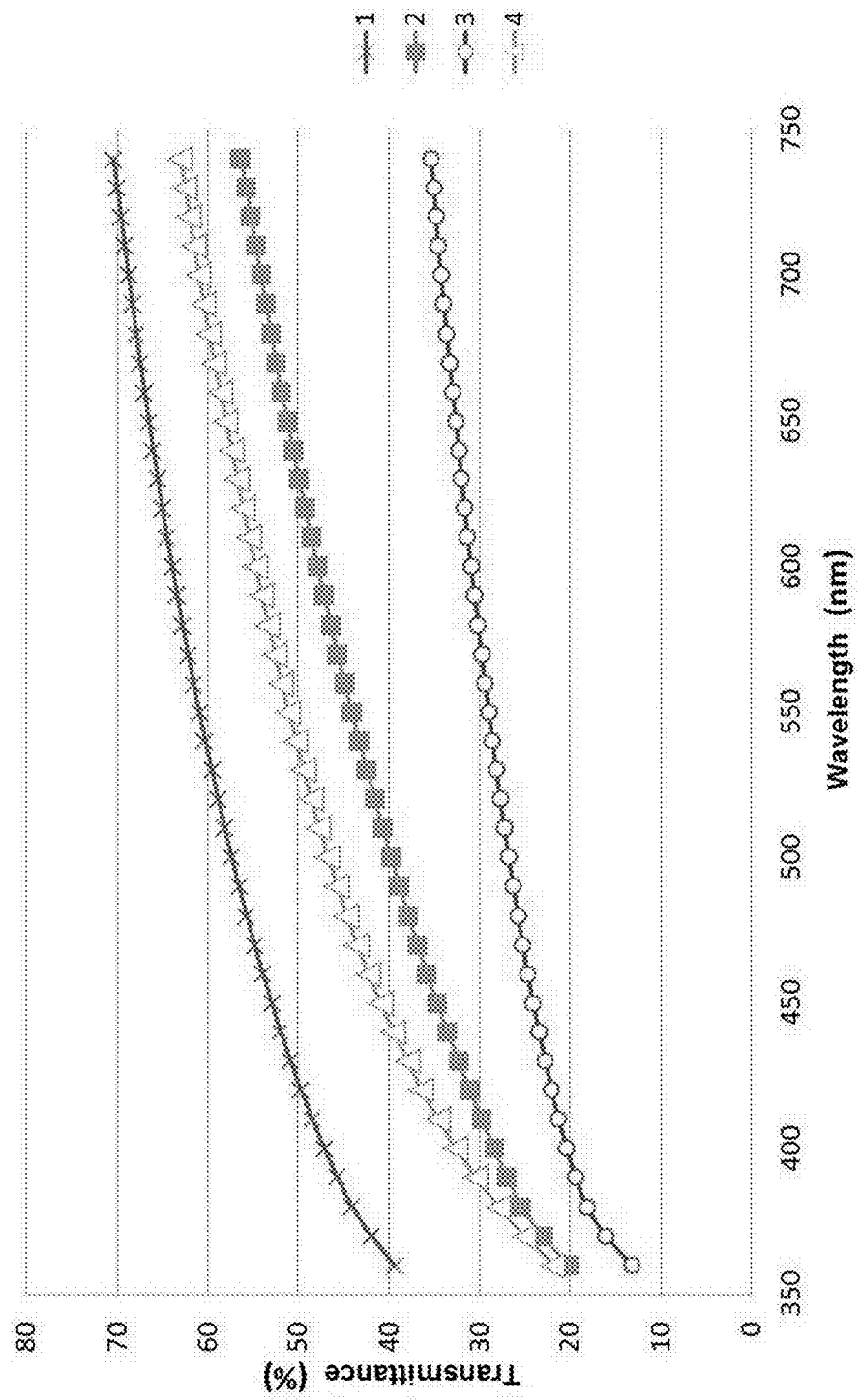

This graph shows the light shielding percentages over the whole of the visible light spectrum, for the three different shielding filler compositions. The measurements were performed using a spectrophotometer, on the wall of the same plastic PET base bottle, changing only the shielding fillers.

Curve 1: corresponds to a commercial solution used for bottling UHT milk, based on PET as the plastic structure and on a combination of 9% by weight TiO2+a 0.05% by weight light absorber as the shielding filler. It can be seen how this combination rapidly loses its shielding capacity as the wavelength increases. The colour of this container is acceptably white, with a L* colour=89.

Curve 2: corresponds to an experiment performed to evaluate the efficacy of Al as a shielding agent by itself. In this case, the plastic PET matrix has been combined with 1% by weight of Al as the shielding filler. From the curve, the high shielding capacity of Al can be deduced and the fact that this shielding capacity remains constant at any wavelength. But the colour of the container is totally grey (L*colour<80), with a metallic look, so that it diverges from the intended object in this invention.

Curve 3: in this experiment the same PET base as in the previous experiments was used, so that the shielding fillers had the same concentration of TiO2 (9% by weight) as in "Curve 1", only replacing the light absorber with 0.12% by weight Al. The result of using Al instead of the conventional light absorber in combination with TiO2 is a very important reinforcement of the shielding level and maintaining it in a much more constant way as the wavelength increases. Furthermore, the colour becomes whiter than in the case represented in "Curve 1", resulting in an L* colour=90

FIG. 2.

Differential scanning calorimetries (DSC) are shown for three different polymer compositions (FIGS. 2.1, 2.2 and 2.3): HIPS; PET, and PET mixed with 8% by weight of HIPS (PET/HIPS ratio=11), to confirm the qualities sought in the polymer base contained in the concentrated additive together with the fillers; these qualities are: amorphous nature without a definite melting point (the thermogram should exhibit a single thermal transition in the Tg); contribution of a more amorphous character to the plastic structure resulting from mixing with PET (glass transition attenuated in the mixture in relation to PET) (absence of splits in the thermal transitions of the mixture)

DSC 1 (HIPS): shows a single thermal transition (Tg) around 90°. The absence of transitions corresponding to crystallization and melting demonstrate the totally amorphous nature of HIPS. The Tg, as is intended, is close to that of PET and slightly higher (as can be seen in the PET thermogram; the latter shows the Tg transition to be around 80° C.). Hence, HIPS is suitable for the purpose of facilitating the processes involved in producing the container that is presented, since it lacks a melting point, it is amorphous and has a Tg close to and slightly higher than that of PET.

DSC 2 (PET): three thermal transitions characteristic of a semi-crystalline polymer can be clearly seen: the first around 80° C., which corresponds to the Tg; another around 134° C. corresponding to crystallization (Tc), with specific heat=+ 7.6 joules/g.; lastly, another at around 252° C. corresponding to melting (Tm), with a specific heat of −39.2 joules/g.

DSC 3 (PET+8% HIPS): shows three transitions of a semi-crystalline matrix, with the following particular characteristics when compared to the "DSC 2" referring to PET alone:

a) Firstly, the three transitions occur in the same temperature environment and without splits. The transitions for PET alone and for the mixture of it with HIPS respectively are: Tg 81° C. vs. 79° C./Tc 134° C. vs. 134° C./Tm 253° C. vs. 251° C. This reveals that there is good miscibility between both polymers and suggests they will behave very much together in the thermal transformation and container moulding processes.

b) Curve 3 (PET+HIPS) shows a crystallization transition (around 130° C.) that is notably attenuated in relation to curve 2 (PET alone), which is apparent both at sight (flatter peak for the mixture) and from the specific heat values (7.6 J/g. for PET vs. 4.5 J/g. for the PET+HIPS mixture). Given that a lower specific heat of crystallization must be interpreted as a lower tendency to crystallize, it can be concluded that HIPS mixed with PET provides the latter with the attenuated crystallization characteristics sought in the polymer matrix of the container that is described.

FIG. 3.

It represents the degree of transparency of different mixtures of PET with other polymers in the absence of light shielding fillers, in such a way that the PET mixture is always present in a proportion of 91% by weight and the polymer mixed in each case is present in a proportion of 8% by weight. The vertical axis of the graph shows the % of light transmitted through the wall of the container (the same in all cases) and the horizontal axis shows the different visible light spectrum wavelengths; in such a way that the greater the transmittance percentage is, the greater the transparency is. Given that one of the accepted criteria for evaluating miscibility (sometimes generically termed "compatibility" although this is not as correct unless the aspect of said compatibility is explained) between polymers is the degree of transparency of mixtures of polymers, in such a way that the greater the transparency, the greater the miscibility is, the most transparent mixtures will be more suitable in the case of this invention, given that the mixture of PET with all of the compounds contained in the concentrate must be homogeneous to ensure the correction practical implementation of the container that is described.

The graph shows the great difference in the miscibility of PET with the different polymers tested. While PP can be considered practically immiscible with PET given that it renders transmittance percentages of between 10% and 30%, mixing with HIPS is notably miscible with transmittance percentages of between 40% and 70%.

FIG. 4

DSC are presented of the mixtures shown in FIG. 3 (91% by weight of PET with 8% by weight of HIPS, PA, PE and PP), to see if the greater degree of miscibility of HIPS when mixed with PET, compared to PA, PE and PP, also takes the form of greater thermal compatibility.

The different DSC graphs (FIG. 4.1, 4.2, 4.3, 4.4) reveal the following:

a) DSC 1: as already seen in "DSC 3" of "FIG. 2" (the same as "DSC 1" of "FIG. 4", the PET+HIPS mixture is perfectly thermally compatible. This is consistent with greater transparency since, if there is good miscibility, we can expect a homogenous mixture that will share some of the characteristics of both of the mixture's components without splits appearing.

b) In DCS 2 (PET+PE), 3 (PET+PP) and 4 (PET+PA), thermal splits do appear, revealed by thermal transition peaks apart from the PET ones. These peaks are in keeping with the melting points of each of the mixture polymers cited (around 100° C. for PE; around 160° C. for PP and around 220° C. for PA). These thermal splits would suggest a behaviour that has little solidarity in thermal transformation processes unlike what occurs with HIPS in its mixture with PET.

FIG. 5.

Shows the influence that the type, concentration and means of providing the light shielding fillers used in combination with TiO2, have on the colour of the container.

Graph 1: relates to a series of experiments in which different concentrates containing HIPS, TiO2 and a light absorber (an iron oxide) have been added and mixed with PET, so that from one to another concentrate only the relative concentration of the light absorber has been altered. The experiments relate to containers 1, 2, 3 and 4 of table 2. The dosage of concentrate was always 17% by weight and the TiO2 content in the containers has remained constant, at around 10% by weight, so that only the absorber content varies from one to another.

It can be seen that as the percentage of absorber increases, the L*colour (white colour measurement) decreases drastically.

Graph 2: in this case the same procedure has been followed as in the previous case, replacing the light absorber with Al in the concentrates. The concentrate addition percentages and TiO2 contents in the containers have continued to be, as in the previous case, 17% by weight and 10% by weight. (Experiments 5, 6, 7, 8 and 9 of table 2).

In this case, the increase in the percentage of Al barely causes the container colour to vary.

Graph 3: the experiments shown relate to the 7 containers of table 3. In this case, using the same concentrated additive that contains HIPS, TiO2 and Al in a weight ratio of TiO2/Al=60, increasing amounts of the concentrated additive have been added to PET.

Surprisingly, it is seen that the greater the percentage of shielding fillers included in the container (and consequently the greater the level of shielding) is, the higher the L*colour is, making the container surface whiter, which is consistent with the possibility of incorporating large amounts of shielding fillers that contain TiO2 and Al in the aforementioned ratios, simultaneously achieving high levels of light shielding and notably white colours in the containers.

The invention claimed is:

1. A single-layer container comprising a thermoplastic matrix with a structural function, formed by at least one semi-crystalline polymer and one amorphous polymer and at least two inorganic fillers with a light-shielding function, dispersed in the thermoplastic matrix, characterised in that:
the structural thermoplastic matrix comprises polyethylene terephthalate (PET) as the semi-crystalline polymer and high impact polystyrene (HIPS) as the amorphous polymer, in a ratio (PET weight)/(HIPS weight) of between 10 and 50,
and in that the inorganic fillers with a light-shielding function contain titanium dioxide (TiO$_2$) and aluminum (Al), in a ratio (TiO$_2$ weight)/(Al weight), of between 50 and 150,
wherein the final composition of the container results from mixing of PET with a concentrated additive that comprises HIPS and inorganic light-shielding fillers.

2. The container according to claim 1, wherein the % by weight of PET contained in the container is between 80% and 93%.

3. The container according to claim 1, wherein the % by weight of TiO$_2$ contained in the container is between 5% and 14%.

4. The container according to claim 1, wherein the % by weight of HIPS contained in the container is between 2% and 9%.

5. The container, according to claim 1, wherein the concentrated additive contains between 30% and 50% HIPS by weight in relation to the weight of the concentrated additive and contains between 50% and 70% light-shielding fillers by weight in relation to the weight of the concentrated additive.

6. The container according to claim 1, wherein the concentrated additive contains between 35% and 45% HIPS by weight and contains between 55% and 65% shielding fillers by weight.

7. The container, according to claim 1, wherein the weight ratio between TiO$_2$ and Al is the same in the concentrated additive as in the container.

8. A procedure of implementation of the container according to claim 1, wherein the HIPS and the inorganic fillers with a light-shielding function are mixed with the PET by means of dosing of the concentrated additive, in a proportion of between 7% and 20% by weight of additive in relation to the total weight of the mixture, to PET previously dehumidified to a water content of less than 0.01% by weight of water in relation to the weight of PET.

9. The procedure according to claim 8, wherein mixing of PET with the concentrated additive containing HIPS, TiO$_2$ and Al, occurs at a point where the PET is in solid form, as granules in a semi-crystalline state with an opaque aspect, and the concentrated additive is also in solid form, as opaque granules.

10. The procedure according to claim 8 wherein, at a moment immediately prior to the mixing of PET with the concentrated additive containing HIPS, TiO$_2$ and Al, the PET presents a higher temperature than that of the concentrated additive.

* * * * *